(12) United States Patent
Hansen

(10) Patent No.: US 12,098,706 B2
(45) Date of Patent: Sep. 24, 2024

(54) HYDRAULIC PITCH DRIVE SYSTEM

(71) Applicant: HAWE ENERGY SOLUTIONS A/S, Copenhagen (DK)

(72) Inventor: Jesper Berg Hansen, Birkerød (DK)

(73) Assignee: HAWE ENERGY SOLUTIONS A/S, Copenhagen K (DK)

( * ) Notice: Subject to any disclaimer, the term of this patent is extended or adjusted under 35 U.S.C. 154(b) by 53 days.

(21) Appl. No.: 17/923,134

(22) PCT Filed: May 7, 2021

(86) PCT No.: PCT/EP2021/062214
§ 371 (c)(1),
(2) Date: Nov. 3, 2022

(87) PCT Pub. No.: WO2021/224488
PCT Pub. Date: Nov. 11, 2021

(65) Prior Publication Data
US 2023/0349360 A1   Nov. 2, 2023

(30) Foreign Application Priority Data

May 7, 2020   (EP) .................................... 20173578

(51) Int. Cl.
*F03D 7/02*   (2006.01)
*F03D 1/06*   (2006.01)
(Continued)

(52) U.S. Cl.
CPC ............ *F03D 7/0224* (2013.01); *F15B 11/04* (2013.01); *F15B 11/044* (2013.01); *F03D 1/06* (2013.01);
(Continued)

(58) Field of Classification Search
CPC .......... F03D 1/06; F03D 1/065; F03D 1/0658; F03D 1/0662; F03D 1/0664;
(Continued)

(56) References Cited

U.S. PATENT DOCUMENTS 5,611,259 A * 3/1997 Nagata .................. B30B 15/161
91/437
2010/0014972 A1 * 1/2010 Steffensen ............ F03D 7/0264
416/31

(Continued)

FOREIGN PATENT DOCUMENTS

| CN | 110925476 A | * | 3/2020 | ............... F03D 7/00 |
| EP | 2392819 A1 | | 12/2011 | |
| EP | 2458201 A1 | | 5/2012 | |
| WO | 2019238188 A1 | | 12/2019 | |

OTHER PUBLICATIONS

CN110925476A_t machine translation thereof (Year: 2020).*

*Primary Examiner* — Kenneth Bomberg
*Assistant Examiner* — Matthew Wiblin
(74) *Attorney, Agent, or Firm* — DINSMORE & SHOHL LLP

(57) ABSTRACT

A hydraulic pitch drive system for controlling a blade pitch angle of a wind turbine rotor has a hydraulic cylinder, for actuating blade pitch rotation, with a piston-side and rod-side. A first hydraulic proportional valve controls hydraulic fluid flow from a pressure port to the cylinder in response to a primary control signal. In an cylinder extending mode, the pressure port via the first hydraulic proportional valve is connected to the piston-side. The rod-side is connected to the pressure port via a non-return valve. A first control module provides the primary control signal in response to a pitch angle positioning request. A second hydraulic proportional valve controls hydraulic fluid flow from the rod-side to tank port independent of the first hydraulic valve, in response to a secondary control signal. A second control (Continued)

module provides the secondary control signal for controlling the second proportional valve in a hydraulic cylinder extending mode.

20 Claims, 11 Drawing Sheets

(51) Int. Cl.
*F15B 11/04* (2006.01)
*F15B 11/044* (2006.01)

(52) U.S. Cl.
CPC ....... *F05B 2260/76* (2013.01); *F05B 2260/79* (2013.01); *F05B 2270/604* (2013.01)

(58) Field of Classification Search
CPC .... F03D 1/0667; F03D 1/0669; F03D 7/0224; F05B 2260/76; F05B 2260/79; F05B 2270/604; F15B 11/022; F15B 11/04; F15B 11/044

See application file for complete search history.

(56) References Cited

U.S. PATENT DOCUMENTS

| | | | |
|---|---|---|---|
| 2012/0134816 A1* | 5/2012 | Andersen | F03D 7/0224 416/31 |
| 2012/0134828 A1* | 5/2012 | Andersen | F03D 7/0264 416/147 |
| 2012/0187681 A1* | 7/2012 | Andersen | F03D 9/11 290/44 |
| 2018/0216638 A1* | 8/2018 | Baba | F15B 1/26 |
| 2019/0055922 A1 | 2/2019 | Schwensen | |

* cited by examiner

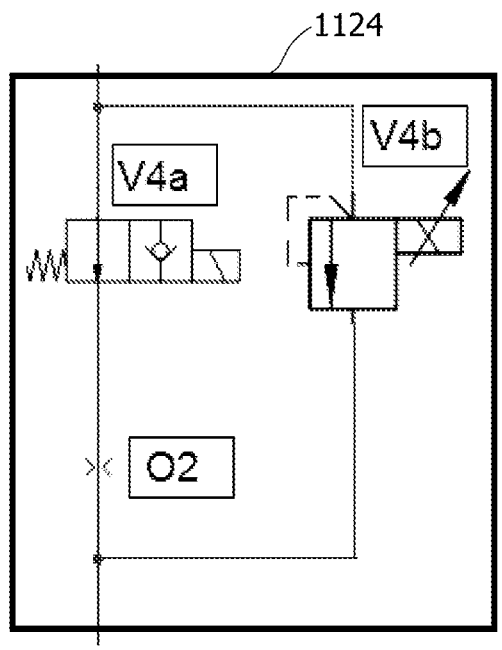
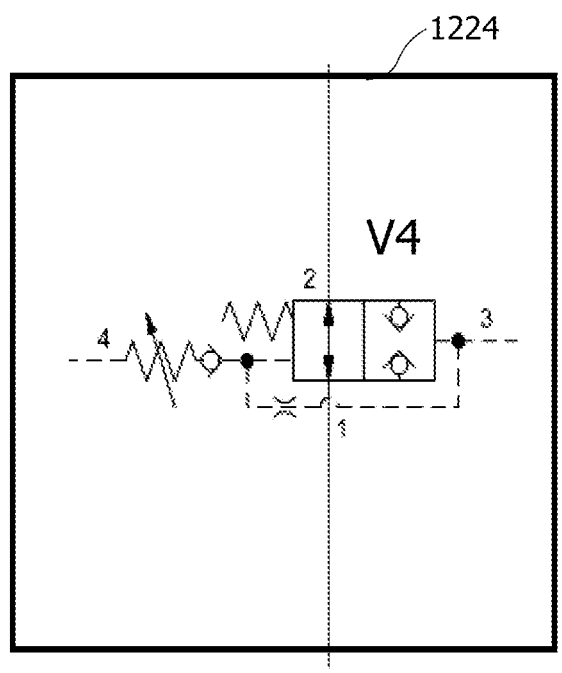
Fig. 11                    Fig. 12
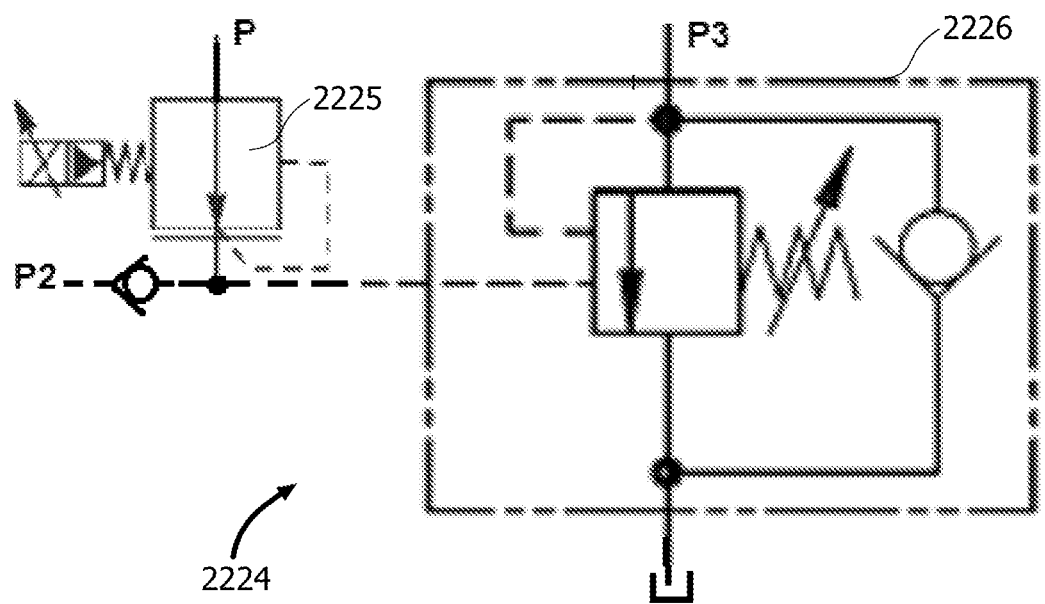
Fig. 22

HYDRAULIC PITCH DRIVE SYSTEM

CROSS-REFERENCE TO RELATED APPLICATIONS

This application is the U.S. National Stage of PCT/EP2021/062214 filed on May 7, 2021, which claims priority to European Patent Application 20173578.4 filed on May 7, 2020, the entire content of both are incorporated herein by reference in their entirety.

FIELD OF THE INVENTION

The present invention relates in one aspect to a hydraulic pitch drive system for controlling a blade pitch angle of a blade on a rotor of a wind turbine. In a further aspect the invention relates to a wind turbine comprising a rotor with one or more blades and a hydraulic pitch drive system for controlling a blade pitch angle of the blades of the rotor. In a yet further aspect the invention relates to a method of controlling a hydraulic pitch drive system for controlling a blade pitch angle of a blade on a rotor of a wind turbine.

BACKGROUND OF THE INVENTION

A wind turbine has a rotor for converting wind energy to a rotary motion about a rotor axis. The energy from the rotary motion may be converted into useful energy by a converter, typically an electrical generator for producing electrical energy supplied to a grid. Typically, the converter and further equipment is arranged in a so-called nacelle on top of a tower. The rotor has a hub mounted to the rotor axis and at least one blade that is mounted to that hub. The hub comprises a hub housing which is typically accessible from the inside for performing service and repair work. Modern wind turbines are typically provided with a pitch system allowing for rotating the blades around a blade axis with respect to the hub so as to control a blade pitch angle β of the blades with respect to the hub. The blade axis extends radially outward with respect to the rotor axis, and follows along a longitudinal axis of the blade. The roots of the one or more blades are mounted to an attachment flange of the hub housing via the pitch system. A typical pitch system comprises a pitch bearing with a fixed portion configured for coupling of the pitch bearing to the hub, and with a moveable portion configured for coupling of the blade to the pitch bearing. Furthermore, the pitch system typically comprises an actuator for driving the pitching motion, and a pitch control system for controlling the pitching motion according to blade pitch requests from a wind turbine controller. The blade pitch motion requests may include instructions for setting a blade pitch angle β and/or time derivatives thereof, i.e. a speed $d\beta/dt$ and/or acceleration $d^2\beta/dt^2$. Such instructions may typically include target values for blade pitch positioning, such as the target blade pitch angle $\beta 0$ and/or time derivatives thereof, i.e. a target speed $d\beta 0/dt$ and/or target acceleration for the requested blade pitch motion $d^2\beta 0/dt^2$.

An important class of modern pitch drive systems use hydraulic actuation for controlling an adjustable blade pitch angle β on a wind turbine comprising a rotor having one or more, or at least two blades, and typically three blades. A hydraulic pitch drive is arranged at the root of each blade. The pitch drive provides a rotatable bearing for the pitch rotation around the longitudinal axis of the blade. The pitch rotation of each blade is actuated hydraulically by means of one or more, typically one or two linear hydraulic cylinders, wherein one end of each of the hydraulic cylinders is attached to the hub of the rotor, and the other end is attached to the blade. By expanding and retracting the hydraulic cylinder, the bearing part that is fixed to the blade may thus be rotated with respect to the bearing part that is fixed to the hub of the rotor, and thereby the blade pitch may be adjusted.

A correct dimensioning of the hydraulic components and design pressure of the hydraulic pitch drive system is considered crucial for safety, reliability, and efficiency of the operation of a wind turbine with adjustable blade pitch angle. However, the choice of the size of components and the corresponding design pressure in the system may involve balancing competing criteria. Furthermore, the design of the hydraulic pitch drive directly affects the initial component cost and the cost of operation and ownership of a wind turbine. Therefore there is a need for providing a designer of a hydraulic pitch drive system with an enhanced design flexibility.

US 2019/0055922 A1 discloses a pitch control system for pitching a wind turbine blade. US 2019/0055922 A1 describes an auxiliary pitch force subsystem, which may boost a pitch force of a hydraulic piston controlled by a main pitch force subsystem. However, activating the auxiliary subsystem of US 2019/0055922 A1 imposes a life-time reduction on the hydraulic piston, unless it is activated subject to a prediction of a future excessive load, and before the excessive load is predicted to occur. The system therefore requires an additional control layer with a predictive module, thus adding to system complexity. Furthermore, activating the auxiliary subsystem of US 2019/0055922 A1 still imposes a life-time reduction on the hydraulic piston, when the control system cannot correctly predict a particular excessive load situation, but is operated in a responsive mode.

EP2458201A1 discloses another hydraulic blade pitch system for controlling the pitch of a single blade of a wind turbine rotor. The hydraulic blade pitch system may have a redundancy of linear hydraulic actuators arranged to operate in parallel. In one embodiment, the system of EP2458201A1 provides a check valve that is controllable to an open position, so that the liquid content of piston rod chambers of the hydraulic actuators may drain through a main control valve to a low pressure tank line instead of recirculating hydraulic fluid from the piston rod chambers to a high pressure return line, in case a higher pressure difference over the pistons of the hydraulic actuators is requested. EP2458201A1 does not in any way address issues of a life-time reduction imposed on the hydraulic cylinders by such an operation mode.

Therefore, there is still a need for a hydraulic pitch drive system with an enhanced efficiency, speed of response and/or reduced cost, without sacrificing on safety and reliability.

In view of these needs, an object of the present invention is improving hydraulic pitch drive systems, or at least providing an alternative, as compared to known hydraulic pitch drive systems with an auxiliary pitch force arrangement.

SUMMARY OF THE INVENTION

According to one aspect, the object of the invention is achieved by a hydraulic pitch drive system for controlling a blade pitch angle on a rotor of a wind turbine as disclosed herein, with advantageous embodiments as disclosed herein.

According to a broad aspect, a hydraulic pitch drive system for controlling a blade pitch angle on a rotor of a wind turbine is provided, the pitch drive system comprising:

a hydraulic cylinder with a piston-side A and a rod-side B, the hydraulic cylinder being arranged to actuate blade pitch rotation;

a first hydraulic proportional valve V3 arranged for controlling a flow of hydraulic fluid from a pressure port P to the hydraulic cylinder in response to a primary control signal S3; wherein in an extending mode of the hydraulic cylinder the pressure port P via the first hydraulic proportional valve V3 is connected to the piston-side A of the hydraulic cylinder; wherein the rod-side B of the hydraulic cylinder via a valve V6 is connected to the pressure port P;

a first control module configured to provide the primary control signal S3 in response to a to a blade pitch angle positioning request;

a second hydraulic proportional valve V4 arranged for controlling a flow of hydraulic fluid from the rod-side B to the tank port T independent of the first hydraulic valve V3, in response to a secondary control signal S4; and a second control module configured to provide the secondary control signal S4 for controlling the second hydraulic proportional valve V4 in an extending mode of the hydraulic cylinder.

The second hydraulic proportional valve V4 is controlled according to a control scheme. The control scheme may be implemented in the second control module.

The hydraulic control logics thus implemented provides two operation modes in the extending mode of the hydraulic cylinder. In a primary extending operation mode, pressurized hydraulic fluid from the rod-side B is regenerated through valve V6 to the pressure port P of the hydraulic pitch drive system. In the primary extending operation mode, a rod-side pressure P3 essentially corresponds to a first pressure available at the pressure port P. Thereby, an efficient operation under normal load conditions is ensured. In a secondary extending operation mode, the rod-side pressure P3 is lowered in a controlled manner, according to the secondary control signal S4, which is generated in the second control module in agreement with a control scheme. Typically, the control scheme identifies a situation where a high load is present or expected, or equivalently a fast extension is requested or expected. Once the situation is identified, the secondary valve (force-boost valve) may be controlled to lower the rod-side pressure accordingly, by returning hydraulic fluid to the tank port in a controlled manner. Thereby, a force-boost mode is provided in the extending mode of the hydraulic cylinder, thereby improving system performance e.g. in terms of responsiveness, and the peak loads a given hydraulic pitch drive system can handle. In a design phase when designing a hydraulic pitch drive system according to given design performance specifications, the performance improvements provide a dimensioning advantage, allowing to reduce system cost and/or increase performance.

A situation requiring a pitch force-boost may be identified by processing measured parameters from the hydraulic pitch system, such as hydraulic pressure values, cylinder position, speed or acceleration, an actual valve element position of the primary valve V3, or similar parameters indicative of a status of a time-dependent load profile on the hydraulic pitch drive system. Processing may include accumulating a history of measured data and applying estimation algorithms, such as involving interpolation, extrapolation, or more complex predictive algorithms. Alternatively or in addition thereto, a situation requiring a force boost may also be identified from an instruction or positioning request received by the hydraulic pitch drive system from a wind turbine controller, as also further detailed below.

The force-boosted secondary extending operation mode is not active all the time, but may be applied temporarily as needed, according to a control scheme, e.g. based on a parameter indicative of cylinder load. A surprising insight underlying the present invention thus resides in the fact that the power efficient regenerative, primary extending operation mode can be kept active most of the time; whereas the force-boosted secondary extending operation mode is only activated in a transient manner, for very short periods of time. Surprisingly therefore, the above-mentioned advantages of performance/dimensioning do not come at a prohibitive expense of hydraulic efficiency, but becomes a viable design option.

By providing the second hydraulic valve V4 as a hydraulic proportional valve, a dynamic control of a rod-side pressure in a high load (or high velocity) situation during extending movement can be achieved as further detailed in the following.

An advantageous aspect of the invention provides a hydraulic pitch drive system for controlling a blade pitch angle of one or more blades on a rotor of a wind turbine, the pitch drive system comprising:

a hydraulic cylinder with a piston-side A and a rod-side B, the hydraulic cylinder being arranged to actuate blade pitch rotation;

a first hydraulic proportional valve V3 configured for controlling a flow of hydraulic fluid from a pressure port P to the hydraulic cylinder in response to a primary control signal S3, wherein in an extending mode of the hydraulic cylinder the pressure port P via the first hydraulic proportional valve V3 is connected to the piston-side A of the hydraulic cylinder;

a first control module configured to generate the primary control signal S3 in response to a to a blade pitch angle positioning request; wherein the rod-side B of the hydraulic cylinder via a non-return valve V6 is connected to the pressure port P for regeneration of pressurized hydraulic fluid; wherein the rod-side B is further connected to a tank port T via a second hydraulic proportional valve V4; wherein the second hydraulic proportional valve V4 is arranged for controlling a flow of hydraulic fluid from the rod-side B to the tank port T independent of the first hydraulic valve V3, in response to a secondary control signal S4; and a second control module configured to provide the secondary control signal S4 for controlling the second hydraulic proportional valve V4 in an extending mode of the hydraulic cylinder.

The primary control signal S3 is for controlling the first hydraulic proportional valve V3 to operate the hydraulic cylinder according to blade pitch angle positioning requests received by the pitch drive system. Depending on a valve position of the first hydraulic proportional valve V3 the hydraulic cylinder is pressurized to extend or retract so as to fulfil the positioning request, be it for a position, a positioning speed and/or an acceleration. The hydraulic cylinder is in a known manner mounted on a rotatable pitch bearing so as to actuate rotation of a moveable, blade-side portion with respect to a fixed, hub-side portion. Extension and retraction of the hydraulic cylinder causes rotation of the moveable portion with respect to the fixed portion. A linear position x of the hydraulic cylinder thus directly maps to a corresponding rotation angle, or blade pitch angle β. The first control module of the hydraulic pitch drive system is thus adapted for controlling the blade pitch angle by generating a primary control signal S3, in response to a blade pitch angle positioning request, typically from a wind turbine controller of the wind turbine.

The second control module is adapted to generate the control signal S4 and apply the control signal S4 to the second hydraulic proportional valve V4 during extension of the hydraulic cylinder, i.e. in the extending mode. The system is thus further configured for opening and closing the secondary proportional valve V4 in a controlled manner during extending movement of the hydraulic cylinder according to a control scheme implemented in the second control module. During retracting mode, the secondary valve V4 is closed.

In the extending mode, the pressure port pressurizes the piston-side of the hydraulic cylinder. When the secondary proportional valve V4 is closed in the extending mode, pressurized hydraulic fluid is regenerated from the rod-side through the non-return valve to the pressure port, typically to an accumulator arrangement provided in connection with the pressure port, thereby allowing for an efficient operation with a good response of the blade pitch actuation under normal operation conditions and load.

When the secondary proportional valve is opened in the extending mode in response to a secondary control signal received from the second control module, the pressure on the rod-side of the hydraulic cylinder is lowered, thereby increasing the maximum force that the hydraulic cylinder can provide. However, in contrast to e.g. an emergency stop where an on/off valve or a safety valve activates and rapidly drains the rod-side hydraulic fluid to tank, the secondary valve of the invention is conceived as a proportional valve, which is opened (and closed) in a controlled manner, so as to meter flow according to a control scheme in a manner allowing for a continued, stable and responsive operation according to the kinematic constraints of the blade pitch system, also when the hydraulic blade pitch system is in an operational mode for continued blade pitch control. To allow for a simple and predictable control, the flow from the rod-side B through the second proportional valve V4 to the tank port T during the extending mode does not pass through V3, i.e. bypasses V3, and is thus independent of the first hydraulic proportional valve V3.

The second control module discriminates between normal load operation, where the secondary valve remains closed and hydraulic fluid is regenerated from the rod-side to the pressure port, and high load operation, where the secondary valve is controlled to meter flow from the rod-side through the second hydraulic proportional valve to the tank port. In particular, the second control module is adapted to set the secondary signal S4 in the extending mode for metering a leakage flow from the rod-side to the tank when a cylinder load is directed opposite to a direction of extension of the hydraulic cylinder, i.e. when the hydraulic cylinder is operated in the first quadrant of hydraulic operation.

Advantageously the secondary control signal is adapted to meter flow from the rod-side through the second hydraulic proportional valve to the tank port when the second control module identifies an external load on the hydraulic cylinder that is directed opposite to the direction of cylinder extension, more particular when an identified load, or a load parameter indicative of said cylinder load, exceeds a predetermined threshold. Further advantageously, the flow rate and/or total amount of flow from the rod-side to the tank port is adjusted according to a control scheme. The control scheme advantageously includes predetermined control stability rules for setting the flow rate and/or total amount leaked to tank through the secondary control valve V4.

One advantage of the system is that it allows for dimensioning the hydraulic components according to a normal operational load as e.g. determined over a longer time scale, yet providing a dynamic reserve for coping with situations of high load, which are typically transient, i.e. lasting only for a short period as compared to normal operation. The transient peak loads may be predictable and dealt with in a predetermined manner, or they may occur at random, but may be detected and dealt with dynamically during operation.

For example, in a regenerative system without the secondary proportional valve the following two parameters are among the determining factors for dimensioning the hydraulic cylinder: the maximum extension force during regenerative operation, F_op,ext; and the maximum extension force during emergency stop, F_em,ext. During extending movement under normal load regenerative operation the rod-side pressure corresponds to the pressure port pressure, and the maximum force F_op,ext can be determined as the product of the pressure P1 supplied at the pressure port P times the cross-sectional area of the rod of the hydraulic cylinder, A_rod. F_op,ext=P1·A_rod. During emergency stop, however, the rod-side fluid is drained to the tank port, and the rod-side pressure can drop to tank pressure. During emergency stop the maximum extension force F_em,ext can then be determined as the product of the pressure P1 supplied at the pressure port P times the cross-sectional area of the bore of the hydraulic cylinder, A_bore. F_em,ext=P1·A_bore. The difference between the bore area A_bore and the rod area A_rod is denoted as the ring area A_ring. A_ring is also a decisive parameter for the maximum retraction force that can be achieved, where a relatively larger ring area as compared to the rod area provides a larger maximum retraction force.

For a given design specification for a hydraulic pitch drive system an active and metered control of a leakage flow from the rod-side directly to the tank port according to the embodiments of the invention allows for a more favorable dimensioning of the hydraulic cylinder than otherwise. By providing an additional dynamic force reserve for coping with high load situations as discussed above, the hydraulic cylinder may be dimensioned according to less demanding values for normal load operation without compromising the efficient and responsive operation required for a continued blade pitch control operation. In particular, for a given ring area as determined by a retraction force requirement, a smaller maximum extension force requirement during operation allows for using a smaller rod diameter, thus allowing for a cylinder with a smaller bore to be used. Accordingly, the dimensioning advantage of the present invention is also beneficial the other way round, i.e. for a given bore size of the cylinder, a reduction in the diameter of the rod correspondingly increases the ring area, thus resulting in an increased retraction force.

As already indicated, the system is particularly useful when the hydraulic pitch drive system is in a continued blade pitch control operational state. The blade pitch control operational state is in particular for controlling blade pitch during wind turbine energy production. In the blade pitch control operational state varying positioning requests are continuously received in order to optimize production during wind turbine operation on a continued basis. By regenerating pressurized fluid under normal operation conditions, and only metering a controlled amount of leakage flow to the tank port in situations where the extending movement meets a high load, for a given dimension of a hydraulic cylinder, an improved responsiveness may thus be achieved.

As mentioned above, the flow of hydraulic fluid from the rod-side B, which is metered through the second hydraulic valve V4 to the tank port T, does not pass through the first hydraulic proportional valve V3, and is thus independent of the first hydraulic proportional valve V3. Nevertheless the actual valve spool position of V3 may be measured and used, e.g. in combination with a parameter indicative of the concurrent cylinder extending movement, to determine whether an excessive load situation is present. The valve spool position of V3 may thus be used to advantage as a sensor input for determining a load parameter indicative of a cylinder load, which may then be used to generate an adequate secondary control signal S4.

Valve V6 is for preventing a hydraulic short circuit from the pressure port P to the tank port T. At the same time V6 allows for flow of hydraulic fluid from the rod-side B of the hydraulic cylinder to the pressure port P for recirculating pressurized hydraulic fluid to the pump and/or accumulator arrangement of the hydraulic pitch drive system. The valve arrangement of the valve V6 and the second hydraulic proportional valve V4 is configured in combination such that when the second hydraulic proportional valve V4 is opened to bleed a proportionally controlled flow of hydraulic fluid to the tank port, a return flow of hydraulic fluid from the rod-side B to the pressure port P via the valve V6 is typically stopped once the rod-side pressure P3 drops below a predetermined value corresponding to the pressure port pressure P1 plus an optional valve bias. This may be achieved in any suitable way. For example, the non-return valve V6 may be a check valve or a biased check valve. The valve V6 may also be provided as an actively controlled ON/OFF valve, which also may be controlled by the second control module, e.g. in response to input parameters indicative of the pressure difference across the valve V6, or as any other non-return valve, which only allows for flow of hydraulic fluid from the rod-side B to the pressure port P when a rod-side pressure P3 at least exceeds a pressure port pressure P1 (plus an optional valve bias), and prevents any return flow from the pressure port P towards the rod-side B when the rod-side pressure is below that threshold pressure. When metering hydraulic fluid from the rod-side through the second hydraulic proportional valve V4, a rod-side pressure P3 drops to below the pressure port pressure P1, and flow from the rod-side B to the pressure port P stops. Instead the hydraulic fluid flows through the tank port to a tank reservoir.

Furthermore, the inlet of V4 is branched off between the rod-side port B and the valve V6. The combined arrangement of V4 and V6 thus prevents any short circuit flow from the pressure port P towards the tank port T when the rod-side pressure is below a threshold pressure P_th, while allowing for a well-controlled lowering of the rod-side pressure P3 to provide an adequately enhanced pitch force reserve. The good pressure control over time achieved by this arrangement allows to avoid sudden changes in the pressure differential in the hydraulic actuator(s) of the system, yet ensuring reliable and fast tracking performance of an actual actuator position with respect to a reference position as targeted by a pitch controller in response to a blade pitch angle request from e.g. a wind turbine controller.

The amount and rate of hydraulic fluid flowing to the tank through the second proportional valve V4 is controlled by the secondary control signal S4 according to a predetermined control scheme. The control scheme may be any suitable control scheme, such as an open loop scheme, or a closed loop scheme. For example, in an open loop control scheme the second proportional valve V4 may be opened, for a controlled time interval, triggered by a control event/criterion being fulfilled, and valve opening of the second proportional valve V4 may be controlled for allowing a flow at a given flow rate over a given length of time. The flow rate and/or length of time may be determined dynamically as a function of any one or more of the below-mentioned input parameters, such as hydraulic pressure, actual and target values for the positioning parameters, first proportional valve position, and blade azimuth angle. In a closed loop control scheme, opening of the second proportional valve V4 may be controlled and dynamically adjusted according to an error signal determined based on a comparison between a current value and a reference value of a control parameter determined based on any one or more of the below-mentioned input parameters, such as hydraulic pressure, actual and target values for the positioning parameters, first proportional valve position, and blade azimuth angle.

Further according to some embodiments of the hydraulic pitch drive system, the secondary control signal S4 is determined to control a set point of the second hydraulic proportional valve V4 responsive to one or more parameters indicative of a current operational status of the hydraulic pitch drive system.

The system may comprise means adapted for monitoring one or more real time parameters indicative of a current operational status of the hydraulic pitch drive system, such as one or more of a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a target blade pitch angle $\beta 0$ and/or time derivatives $d\beta 0/dt$ or $d^2\beta 0/dt^2$ thereof, or a blade azimuth angle $\alpha$. Alternative or in addition thereto, the system may be adapted to communicate with one or more external monitoring devices so as to receive such real time parameters as an input. The real time operational status parameters may thereby be made available to the first and second control modules of the hydraulic pitch drive system. By controlling the set-point of the second hydraulic proportional valve V4 in response to real time parameters indicative of the current operational status, the hydraulic pitch drive system can respond to any external load scenario, including scenarios with an excessive load caused by external events regardless of whether or not these events might be predictable. As further mentioned below, this is particularly advantageous if implemented such that the second hydraulic proportional valve V4 is opened responsive to one or more of the operational status parameters, or a quantity derivable therefrom, exceeds a threshold, which is representative of a cylinder load $F_L$ below a maximum force capacity F_op of a given hydraulic pitch drive system, at a rated accumulator operating pressure P1 for the given hydraulic pitch drive system. Thereby, an adequate pitch force reserve can be maintained in a continuous manner, thus allowing for stable and precise tracking response of the hydraulic pitch drive system without the risk of undesirable and dangerous interruptions to the blade pitch actuation motion. As also detailed below, this is further achieved by the embodiments of the present invention without detrimental sudden pressure jumps that would vastly affect the life-time of the hydraulic components in the system. As a consequence, the invention provides a stable and precise tracking hydraulic pitch force system that, in contrast to known systems, is viable for continued use without being hampered by the need of predicting a future load on the hydraulic pitch force system. Embodiments supporting and/or contributing to these advantages may in particular include one or more of the embodiments discussed in the following.

Further according to some embodiments of the hydraulic pitch drive system, the control signal S4 is determined according to a cylinder load on the hydraulic cylinder. The secondary control signal S4 may be determined according to an operational status parameter of the pitch drive system during extension of the cylinder. Flow through the second hydraulic proportional valve V4 may thus be controlled according to a value of the operational status parameter. The operational status parameter is a parameter indicative of a load acting on the hydraulic cylinder during extension. The load parameter indicative of a cylinder load can be determined in any suitable way, e.g. based on measured, estimated, and/or predetermined operational parameters of the hydraulic pitch drive system as further detailed below. By actively controlling the second proportional valve V4 according to a cylinder load, the dynamic force reserve can be controlled in an optimized way, keeping the amount of hydraulic fluid leaked to the tank port to a minimum.

Further according to some embodiments of the hydraulic pitch drive system, the secondary control signal S4 may be determined with respect to one or more threshold values.

Further according to some embodiments of the hydraulic pitch drive system, the threshold values may be set for one or more of the real time parameters monitored by the system, or any combination thereof.

Further according to some embodiments of the hydraulic pitch drive system, the one or more threshold values may be determined based on one or more of: a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a target blade pitch angle $\beta 0$ and/or time derivatives $d\beta 0/dt$ or $d^2\beta 0/dt^2$ thereof, or a blade azimuth angle $\alpha$.

Further according to some embodiments of the hydraulic pitch drive system, the secondary control signal S4 may be configured such that the second hydraulic proportional valve V4 is opened in response to a parameter indicative of cylinder load $F_L$ exceeding a first threshold value.

Further according to some embodiments of the hydraulic pitch drive system, the control signal S4 may be determined based on the difference between the parameter indicative of cylinder load $F_L$ and the first threshold value.

Further according to some embodiments of the hydraulic pitch drive system, the secondary control signal S4 may be configured such that the second hydraulic proportional valve V4 is closed in response to a parameter indicative of cylinder load $F_L$ dropping below a second threshold value.

Further according to some embodiments of the hydraulic pitch drive system, the first threshold value may represent a first threshold cylinder load $F_{L,open}$ less than a maximum cylinder load $F_{L,max}$, such as a first threshold cylinder load $F_{L,open}$ in the range 50%-90%, or 55%-85%, or 60%-80% of the maximum cylinder load $F_{L,max}$.

Further according to some embodiments of the hydraulic pitch drive system, the second threshold value may represent a second threshold cylinder load $F_{L,close}$ less than the first threshold cylinder load $F_{L,open}$.

Further according to some embodiments of the hydraulic pitch drive system, the second threshold value may represent a second threshold cylinder load $F_{L,close}$ less than the first threshold cylinder load $F_{L,open}$, such as a difference between the second threshold cylinder load $F_{L,close}$ and the first threshold cylinder load $F_{L,open}$ in the range 1%-20%, or 5%-25%, or 10%-20% of the maximum cylinder load $F_{L,max}$.

Further according to some embodiments of the hydraulic pitch drive system, the secondary control signal S4 is determined based on one or more of: a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a target blade pitch angle $\beta 0$ and/or time derivatives $d\beta 0/dt$ or $d^2\beta 0/dt^2$ thereof, or a blade azimuth angle $\alpha$.

Using a single parameter as a control parameter for determining the secondary control signal provides a simple, yet effective control scheme, which is particularly useful for relatively straightforward operational conditions, which may further be less demanding regarding precision of the control. For example, assuming that the first pressure P1 is kept relatively steady in the respective working mode, a high load situation can be determined from an increase in or a high value of the second pressure P2, e.g. exceeding a given threshold. Another simple parameter merely determined by the geometry of the actuator may be a target blade pitch angle where the linear extension force of the hydraulic cylinder is known to result in a low torque. The second control module may then in response to such a target blade pitch angle determine a secondary control signal for opening the second proportional valve accordingly. Similarly, a target velocity request indicating a high blade pitch control velocity, or a blade azimuth angle indicating high load in the pitch bearing due to gravity or aerodynamic forces, may all be used for determining a corresponding secondary control signal for opening the second proportional valve to cope with the situation in a more efficient and responsive manner.

Further according to some embodiments of the hydraulic pitch drive system, the secondary control signal S4 is determined based on a combination of two or more of: a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a target blade pitch angle $\beta 0$ and/or time derivatives $d\beta 0/dt$, $d^2\beta 0/dt^2$ thereof, or a blade azimuth angle $\alpha$.

By employing a combination of two or more parameters for determining the secondary control signal, a more precise control of the flow through the second proportional valve can be achieved. Furthermore, a parameter indicative of the current load can be determined more precisely, and used for dynamically controlling the second proportional valve to lower the rod-side pressure P3 in a controlled manner to improve positioning response.

For example, an observed discrepancy between a target value and an actual value for the position and/or speed of the rod, or the corresponding blade pitch angle, may also be used to control the second proportional valve to achieve a more responsive and precise control behavior. Furthermore, comparing an observed spool position y of the first proportional valve V3 to an actual value for the speed of the rod, or the corresponding blade pitch angle, based on a reference mapping of the system behavior e.g. in the absence of load, may show a significant deviation from the reference mapping. The observed deviation may then be used as a parameter indicative of a cylinder load in a relatively simple and low-cost, yet precise control scheme.

Further according to some embodiments of the hydraulic pitch drive system, the secondary control signal S4 is determined based on a difference between a first pressure P1 at the pressure port P and a second pressure P2 at the piston-side A of the hydraulic cylinder. Determining a difference between the first and second pressures P1 and P2, when measured during extension on either side of the first proportional valve V3, respectively, provides a precise indication of the current load in the system. Adjusting the rod-side pressure P3 accordingly by a controlling the opening of the second proportional valve V4 in response to a control signal S4 indicative of said difference thus achieves a precise and responsive control behavior of the hydraulic pitch drive system.

Further according to some embodiments of the hydraulic pitch drive system, determining the secondary control signal S4 includes measuring one or more of: a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a spool position y of the first hydraulic proportional valve V3, a blade pitch angle $\beta$ and/or time derivatives $d\beta/dt$, $d^2\beta/dt^2$ thereof, or a blade azimuth angle $\alpha$. By measuring one or more of the input parameters for determining the secondary control signal allows for dynamically controlling the valve setting of the second proportional valve V4 during extending movement, according to the measured operational parameters, e.g. in a closed loop control scheme. Thereby a highly precise and dynamic response of the control behavior is achieved.

Further according to some embodiments of the hydraulic pitch drive system determining the control signal S4 includes estimating one or more of: a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a blade pitch angle $\beta$ and/or time derivatives $d\beta/dt$, $d^2\beta/dt^2$ thereof, or a blade azimuth angle $\alpha$. Thereby, an improved responsiveness in the control behavior of the hydraulic pitch drive system may be achieved with relatively simple means.

Estimation may include any suitable techniques of estimation, such as interpolation, extrapolation, predictive algorithm, a trained algorithm, a learning algorithm, calculation, and/or approximation using a predetermined function, such as a parametrized function. Estimation may take as input values for one or more of the above-mentioned parameters, such as a first pressure P1 at the pressure port P, a second pressure P2 at the piston-side A, a third pressure P3 at the rod-side B, a rod position x of the hydraulic cylinder and/or time derivatives $dx/dt$ or $d^2x/dt^2$ thereof, a target blade pitch angle $\beta 0$ and/or time derivatives $d\beta 0/dt$ or $d^2\beta 0/dt^2$ thereof, a spool position y of the first hydraulic valve V3, or a blade azimuth angle $\alpha$.

Further according to some embodiments of the hydraulic pitch drive system the control signal S4 is determined based on a comparison between an actual value and a predetermined reference value of a parameter indicative of the cylinder load. Using a predetermined mapping of parameter values into reference values, a deviation can thus be determined in a simple manner during extending mode, and may be used for discriminating between a normal operation mode where the second proportional valve is closed, and a high load situation where said second proportional valve is opened according to the observed deviation. Thereby, an enhanced responsiveness of the hydraulic pitch drive system is achieved in a simple, yet reliable and efficient manner.

Further according to some embodiments of the hydraulic pitch drive system, the secondary control signal S4 is determined selectively in response to predetermined operation instructions, such as in response to a blade pitch feathering instruction. Thereby, a particularly simple improvement of the responsiveness of the hydraulic pitch drive system is achieved for predictable load situations.

The following are advantageous embodiments of the hydraulic pitch drive system with different advantageous valve arrangements for implementing the second proportional valve V4 and further implementing an emergency function for directly flushing hydraulic fluid from the rod-side to the tank port in case of an emergency stop.

Further according to some embodiments of the hydraulic pitch drive system, the second hydraulic proportional valve V4 is one of: a normally open flow control valve, a normally closed flow control valve, a normally open pressure control valve, a normally closed pressure control valve. Thereby a simple and cost effective implementation is achieved, which furthermore can be configured through software control in a flexible manner.

Further according to some embodiments of the hydraulic pitch drive system, the second hydraulic proportional valve V4 is a normally open valve configured when de-energized to provide a fully open connection from the rod-side B to the tank port T, said open connection being adapted for emergency stop. Thereby a simple and cost-effective implementation is achieved, and reducing system complexity.

Further according to some embodiments of the hydraulic pitch drive system, the second hydraulic proportional valve V4 is a normally closed valve V4b, and wherein the hydraulic pitch system further comprises a bypass valve arrangement V4a providing an open connection from the rod-side B to the tank port T parallel to the second hydraulic proportional valve V4b when the bypass valve arrangement V4a is de-energized, said open connection being adapted for emergency stop. Thereby, an implementation with improved reliability, due to separation of the valve functions in separate valve components, is achieved.

Further according to some embodiments of the hydraulic pitch drive system the second hydraulic proportional valve V4 is a hydraulic pilot pressure controlled valve, e.g. a hydraulic logic element, an overcenter valve, a counterbalance valve, a sequence valve, a pilot assisted relief valve, or similar. The pilot pressure for controlling the hydraulic pilot pressure controlled valve may be generated in any suitable manner. Thereby a large flexibility in system design becomes available, which e.g. allows for combining advantages of hydraulic and electric control logics.

For example, the pilot pressure may be provided by an electrically controlled proportional valve, in particular for normal operation. Thereby a large flexibility in optimizing and adapting control schemes by means of a digital control logics is possible.

In some embodiments, the pilot pressure may also be provided by means of hydraulic components. It may thus be noted that a control signal for controlling the hydraulic proportional valve arrangement may also be derived by a hydraulic logic. Thereby a non-electric implementation may be achieved, which is robust against electrical failures, at the expense of a less flexible implementation.

Further according to some embodiments of the hydraulic pitch drive system the second hydraulic proportional valve V4 is a combination of a hydraulic proportional valve and a pilot controlled hydraulic logic element, overcenter-valve or similar. Thereby both a non-electric implementation may be achieved, e.g. for use in emergency stop, and an electrically controlled implementation may be achieved, e.g. for non-emergency operation.

Further according to some embodiments of the hydraulic pitch drive system the hydraulic logic element is controlled by a first pressure P1 at the pressure port P and a second pressure P2 at the piston-side of the hydraulic cylinder. Thereby the advantages of a reliable operation that is robust against electrical failures are synergistically combined with advantages of using the observed pressure difference between the first and second pressures as an indicator of cylinder load, wherein the observations of the first and second pressures are directly obtained through corresponding pilot pressure lines.

Advantageously according to some embodiments of the hydraulic pitch drive system, the blade pitch system comprises a pitch controller configured to generate the primary control signal S3 for controlling the first hydraulic proportional valve V3 to operate the hydraulic cylinder according to a blade pitch angle positioning request for the pitch drive system; wherein the pitch controller is further configured to generate the secondary control signal S4 for controlling the second hydraulic proportional valve V4 according to a predetermined control scheme.

According to further aspects of the invention a wind turbine comprises a rotor with one or more blades and a hydraulic pitch drive system for controlling a blade pitch angle of the blades of the rotor according to any of the embodiments as disclosed herein.

According to yet further aspects of the invention a method of controlling a hydraulic pitch drive system for controlling a blade pitch angle of a blade on a rotor of a wind turbine performs the steps as discussed in relation to the disclosure of operating the hydraulic pitch drive system according to any of the embodiments as disclosed herein.

BRIEF DESCRIPTION OF THE DRAWINGS

Preferred embodiments of the invention will be described in more detail in connection with the appended drawings, which show

FIGS. 8-12, and 22 are diagrams of embodiments of a second hydraulic proportional valve in different valve arrangements;

DETAILED DESCRIPTION OF THE INVENTION

Figure 1:
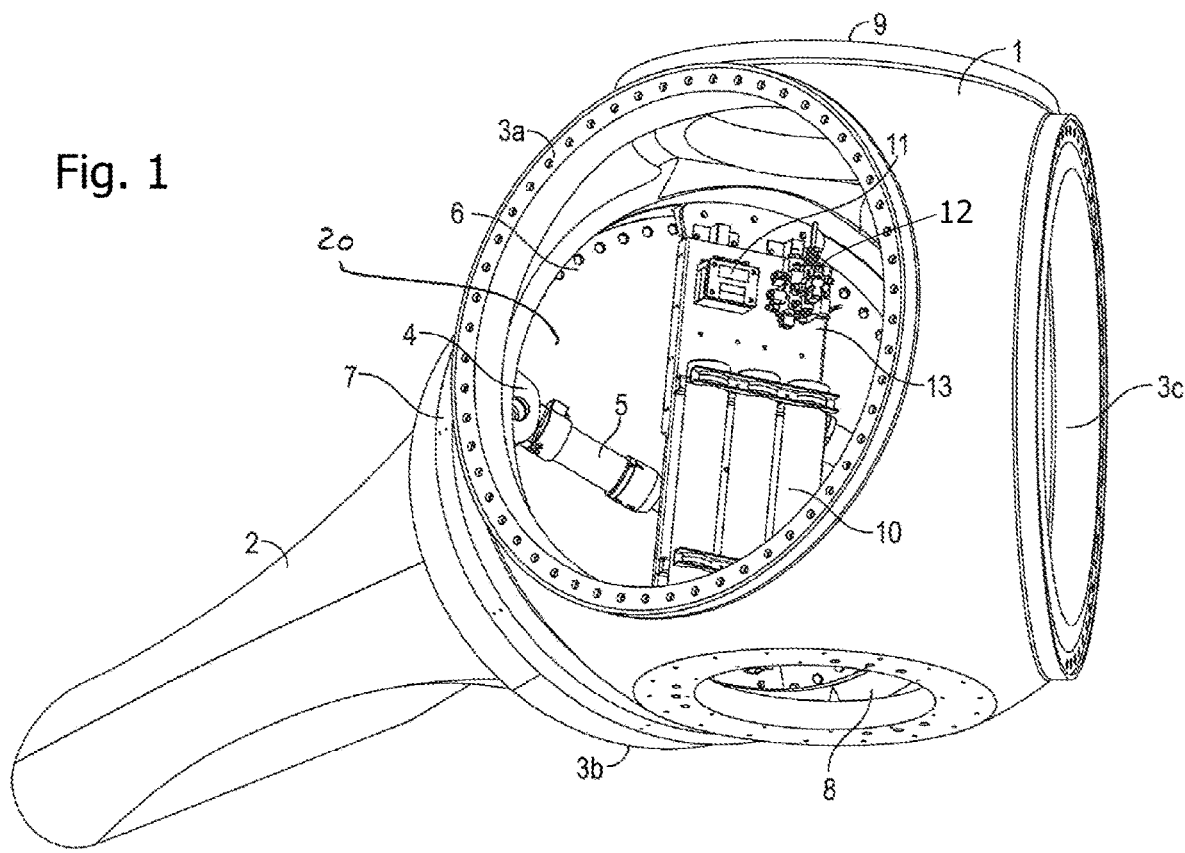
FIG. 1 is a perspective view of a part of a hub accommodating a hydraulic pitch drive system according to one embodiment in a wind turbine.
Figure 2:
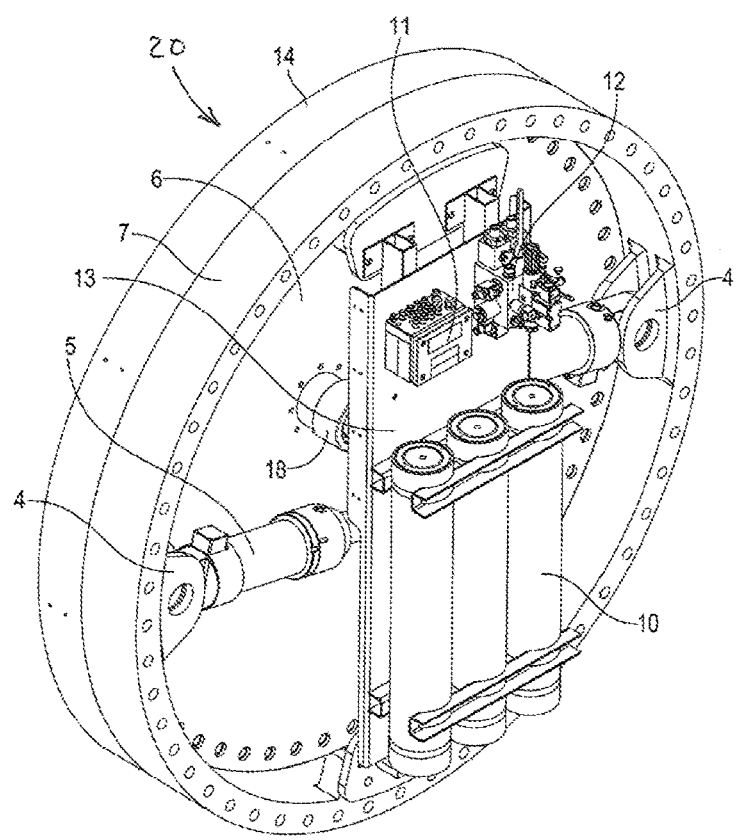
FIG. 2 is a perspective view of a hydraulic pitch drive system for one rotor blade according to one embodiment.
Figure 3:
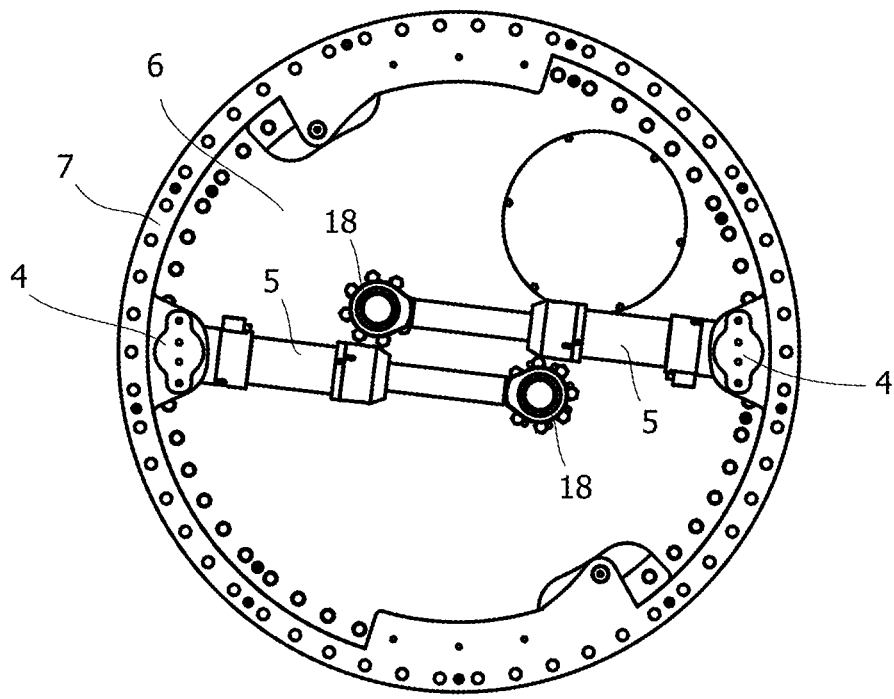
FIGS. 3 and 4 are elevational views of a hydraulic pitch drive of a hydraulic pitch drive system according to one embodiment, in two operational states.
Figure 4:
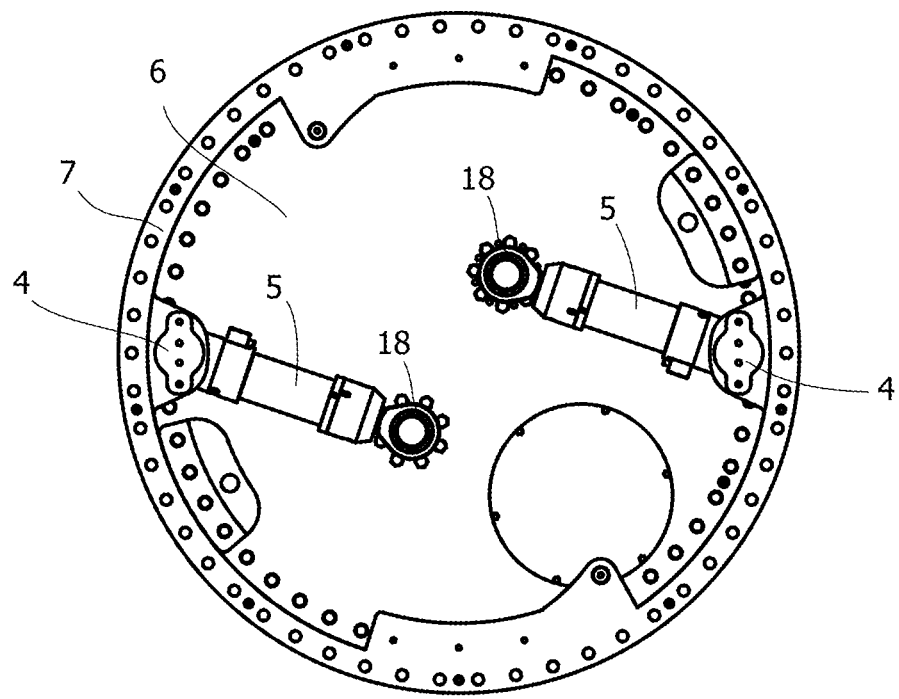

Referring to FIGS. 1-4, an embodiment of a hydraulic pitch drive system 20 for use on a rotor of a wind turbine is described. FIG. 1 shows a perspective view of a hub 1 accommodating a hydraulic pitch drive system 20 according to one embodiment in a wind turbine. The hub 1 is adapted to be connected to a nacelle (not shown) at the flange denoted 9. A rotor blade 2 is connected at flange 3b. Further flanges 3, 3a are for connecting further blades (not shown). Each blade has a hydraulic pitch drive system 20 comprising at least one hydraulic drive member 5, so-called pitch cylinders. Each pitch cylinder is connected to a fixed portion 7 at connection points 4 which can receive a corresponding mounting eye of the pitch cylinders (see FIGS. 2-4). The opposite end of the pitch cylinder is connected to a moveable portion 6 by corresponding cylinder bearings 18. An inspection hole 8 may be provided at the wind facing end of the hub, which is normally covered by a closure. A bridge 13 is mounted on the fixed portion 7. The fixed portion 7 is adapted to have mechanical, pneumatic and electrical devices mounted on it such as accumulators 10, and electrical parts 11 and hydraulic parts 12 of the hydraulic control system, which may be collected on the bridge 13. FIGS. 3 and 4 show elevational views of the hydraulic pitch drive in two different operational states. FIG. 3 shows the hydraulic pitch drive in a feather position, where the hydraulic cylinders 5 are in a fully extended state. FIG. 4 shows the hydraulic pitch drive in an operational position, at the other end of cylinder travel, where the hydraulic cylinders are fully retracted. Because of the geometry, when approaching the feather position from the operational position, the hydraulic cylinders have an increasingly unfavorable conversion of the cylinder force into rotational torque. While the hydraulic pitch drive system for controlling a blade pitch angle on a rotor of a wind turbine is here, in FIGS. 1-4, shown with a particular mechanical actuator arrangement, it should be noted that the inventive hydraulic control in the extending mode is also useful for other embodiments of a hydraulic pitch drive with a different mechanical arrangement of the pitch rotation actuator parts. For example, the moveable part for receiving the blade root may be formed as a ring instead of a disk. Furthermore the moveable part may be an outer ring, rather than an inner disk or ring. Furthermore, the number of hydraulic cylinders may vary. For example, the number of hydraulic cylinders in a blade pitch actuator arrangement for each blade may be one, instead of two e.g. to reduce system complexity and cost for smaller wind turbines; alternatively, the number may e.g. be three in order to increase redundancy in the system at the expense of an increased system complexity.

Accordingly, in the following schematics, where a single pitch cylinder or hydraulic cylinder is shown and referred to, this is intended to represent one or more blade pitch actuator arrangements of a wind turbine, which each may include one or more hydraulic cylinders working in parallel.

Figure 5:
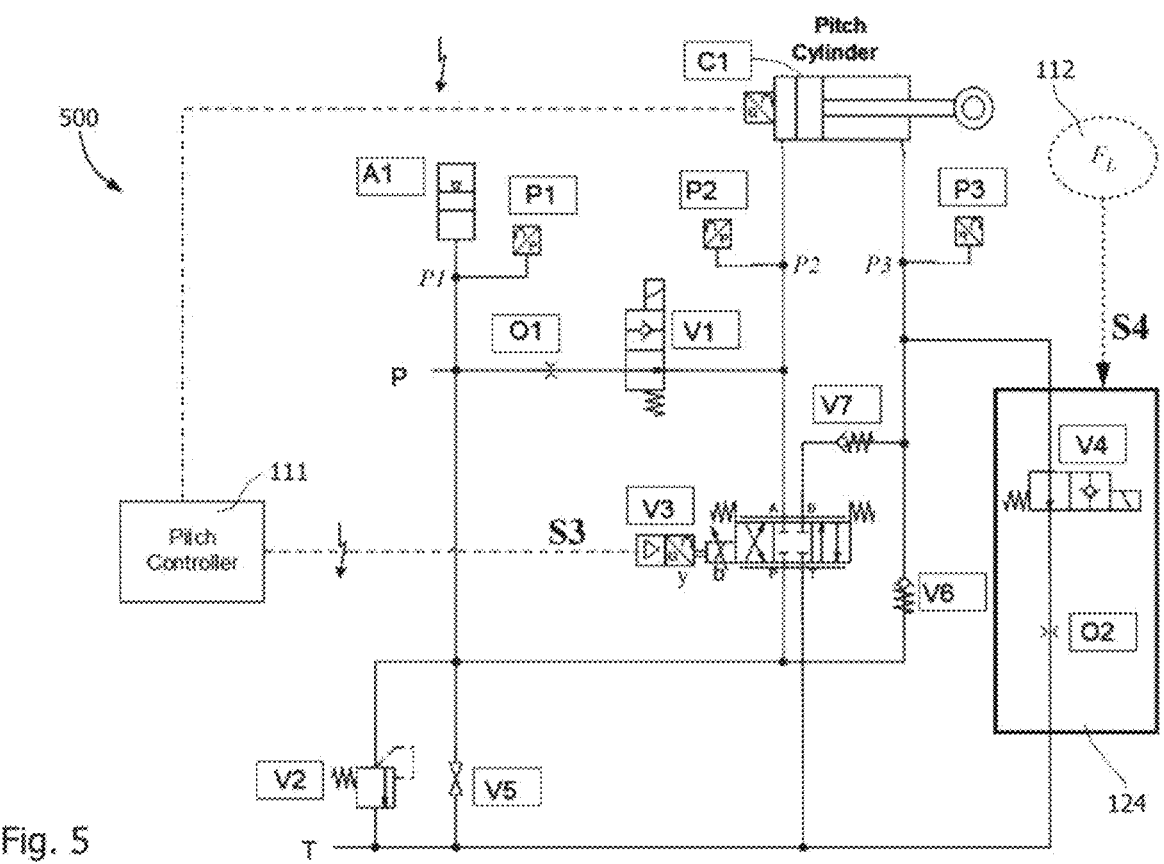
FIG. 5 is a schematic diagram of a hydraulic pitch drive system according to one embodiment.

FIG. 5 shows a schematic diagram of a hydraulic pitch drive system 500 according to one embodiment. The schematic accommodates three basic hydraulic blade pitch drive modes as commonly provided in a wind turbine with adjustable blade pitch: an extending mode for controlling an extending movement of the hydraulic cylinder during normal operation of the wind turbine, a retraction mode for controlling a retraction movement of the hydraulic cylinder during normal operation of the wind turbine, and an emergency stop mode for moving the blades into an emergency stop position under emergency conditions.

The hydraulic pitch drive system comprises a hydraulic cylinder C1 with a piston-side A and a rod-side B. The hydraulic cylinder is arranged to actuate blade pitch rotation by means of a blade pitch actuator arrangement, such as those discussed above. The hydraulic pitch drive system further comprises a pressure port P providing pressurized hydraulic fluid at a first pressure P1 to the hydraulic pitch drive system from a hydraulic pressure unit (not shown) and a tank port T for collecting hydraulic fluid to a tank reservoir (not shown). The pressure at the tank port T is at a tank pressure, or close to said tank pressure, which is the lowest pressure in the system, typically corresponding to ambient pressure. An accumulator A1 is connected to the pressure port P for storing pressurized fluid, which during operation may be regenerated to the hydraulic pitch drive. The pressure port P is typically connected to the tank port T via a safety valve V2 and a service valve V5. Valve V2 is usually closed under operation, unless the pressure port side pressure exceeds an unsafe level. Valve V5 is also usually closed under operation, and only opened under service and repair procedures. The schematic is shown in a de-energized state, where all actuated valves are in their respective default position. The de-energized state also corresponds to the state of the system in an emergency stop. In the de-energized state, valve V1 is fully open to provide pressurized fluid through orifice O1 to the piston side; valve V4 is fully open to drain hydraulic fluid from the rod-side B through orifice O2 to the tank port T; and valves V3, V6 and V7 are closed. In the emergency mode, the hydraulic cylinder fully extends at full speed as determined by the orifices O1 and O2, wherein pressurized fluid from the rod-side is sent to the tank port typically without pressure regeneration. After an emergency stop, the system needs to recover, before normal operation can be resumed.

In the retracting mode under normal operation, the valves V1 and V4, are closed. Pressurized fluid from pressure port P is then metered through the first proportional valve V3 in the cross-connection configuration (crossed arrows symbol) via the non-return valve V7 to the rod-side B. Correspondingly, hydraulic fluid from the piston side A is metered through the first proportional valve V3 to the tank port T. The flow through the first proportional valve V3 is controlled in response to a primary control signal S3 provided by a first control module 111. The first control module is configured to provide the primary control signal S3 in response to a to a blade pitch angle positioning request from a wind turbine controller (not shown). Thereby, the rod end is retracted into the cylinder in a controlled manner.

In the extending mode under normal operation, valve V1 is closed, and under normal load conditions, also V4 is closed. In the extending mode, the pressure port P is connected via the first hydraulic proportional valve V3 in parallel connection configuration (anti-parallel arrows symbol) to the piston-side A of the hydraulic cylinder, and the rod-side B of the hydraulic cylinder is connected via a non-return valve V6 to the pressure port P with accumulator A1, where pressurized hydraulic fluid can be stored for regeneration. The flow through the first proportional valve V3 is again controlled in response to the primary control signal S3 provided by the first control module 111, wherein the first control module 111 is configured to provide the primary control signal S3 in response to a blade pitch angle positioning request from the wind turbine controller (not shown). Hydraulic fluid is thus metered from the pressure port P via the first hydraulic valve V3 to the piston side B of the cylinder and regenerated accordingly from the rod-side B via non-return valve V6 back to the pressure port P, whereas non-return valve V7 prevents any flow from the rod-side B through the first proportional valve V3 to the tank port T. Thereby, an extending movement of the rod-end from the cylinder is performed in a controlled manner, under normal load conditions. For a simplified schematic of the system in an extending operation mode, where components that are only related to the retracting operation mode have been omitted, see also FIG. 13, wherein corresponding references identify corresponding components.

In order to drive the extending movement, a flow of hydraulic fluid through the first proportional valve is required. To support such a flow, a second pressure P2 at the piston side A, downstream of the first proportional valve V3 has to be lower than the first pressure P1 upstream thereof. When the cylinder in the extending mode meets an increasing load directed opposite to the extending movement (first quadrant of hydraulic operation of the hydraulic cylinder), the second pressure P2 approaches P1, and in the limit, the extending movement may come to a standstill. Throughout extending movement with regeneration of the pressurized hydraulic fluid through the non-return valve V6, a third pressure P3 on the rod-side B essentially corresponds to the first pressure P1.

The inventive system identifies a high load situation during the extending movement, generates a secondary control signal S4 based on the identified cylinder load situation, and provides the secondary control signal S4 to a second proportional valve V4. The second hydraulic proportional valve V4 is arranged for controlling a flow of hydraulic fluid from the rod-side B to the tank port T independent of the first hydraulic valve V3, in response to the secondary control signal S4. A second control module 112 is configured to provide the secondary control signal S4 for controlling the secondary proportional valve V4 in the extending mode of the hydraulic cylinder, so as to lower the third pressure P3 in a controlled manner. As a consequence of lowering the third pressure P3 on the rod-side B, also the second pressure P2 on the piston side drops as compared to the first pressure P1, thereby re-establishing, or at least increasing a flow through the first proportional valve V3 closer to the flow corresponding to a valve position y under low load or unloaded conditions.

As indicated in FIG. 5, the hydraulic pitch system 500 may be equipped with sensors adapted to measure the first pressure P1, the second pressure P2, the third pressure P3, a valve element position y of the first hydraulic proportional valve V3, a cylinder position x and/or time derivatives thereof, or the equivalent actual blade pitch angle corresponding to the cylinder position. Based one or more of these measurements in combination, a current hydraulic operational status of the hydraulic pitch drive system may be determined. The hydraulic operational status may include a load parameter indicative of a current cylinder load. The load parameter, or a corresponding information may be provided to the second control module, which then provides the secondary control signal S4 in order to control leakage flow from the rod-side B to the tank port T, through the second hydraulic proportional valve V4 to lower the pressure P3 accordingly.

As mentioned above, the flow through the first proportional valve V3, and thus the extension velocity dx/dt of the hydraulic cylinder C1, is in the first quadrant of hydraulic operation generally dependent on the difference between the first and second pressures P1, P2. This may be described, e.g. as $dx/dt = y \cdot c \cdot \sqrt{P1-P2}$, where y is the valve element position of the first proportional valve V3 and c is a constant characterizing the first proportional valve. As a consequence, the maximum velocity of the hydraulic cylinder, which may be considered as a parameter indicative of the responsiveness of the hydraulic pitch drive system, is limited by the pressure difference. In a known system this limitation may be overcome by using a first proportional valve V3, which is dimensioned larger to achieve a large constant c. However, by applying a load dependent lowering of the working pressure in the hydraulic cylinder through a controlled leakage through the second proportional valve V4 in-situ during extension operation, the first proportional valve V3 may be kept smaller without compromising on the responsiveness of the hydraulic pitch drive system—or analogue thereto a higher responsiveness is achieved for extending movements for a given choice of the first proportional valve V3. In this way, the dimensioning advantage for the hydraulic components of the hydraulic pitch drive system also applies to the first proportional valve V3.

Figure 6:
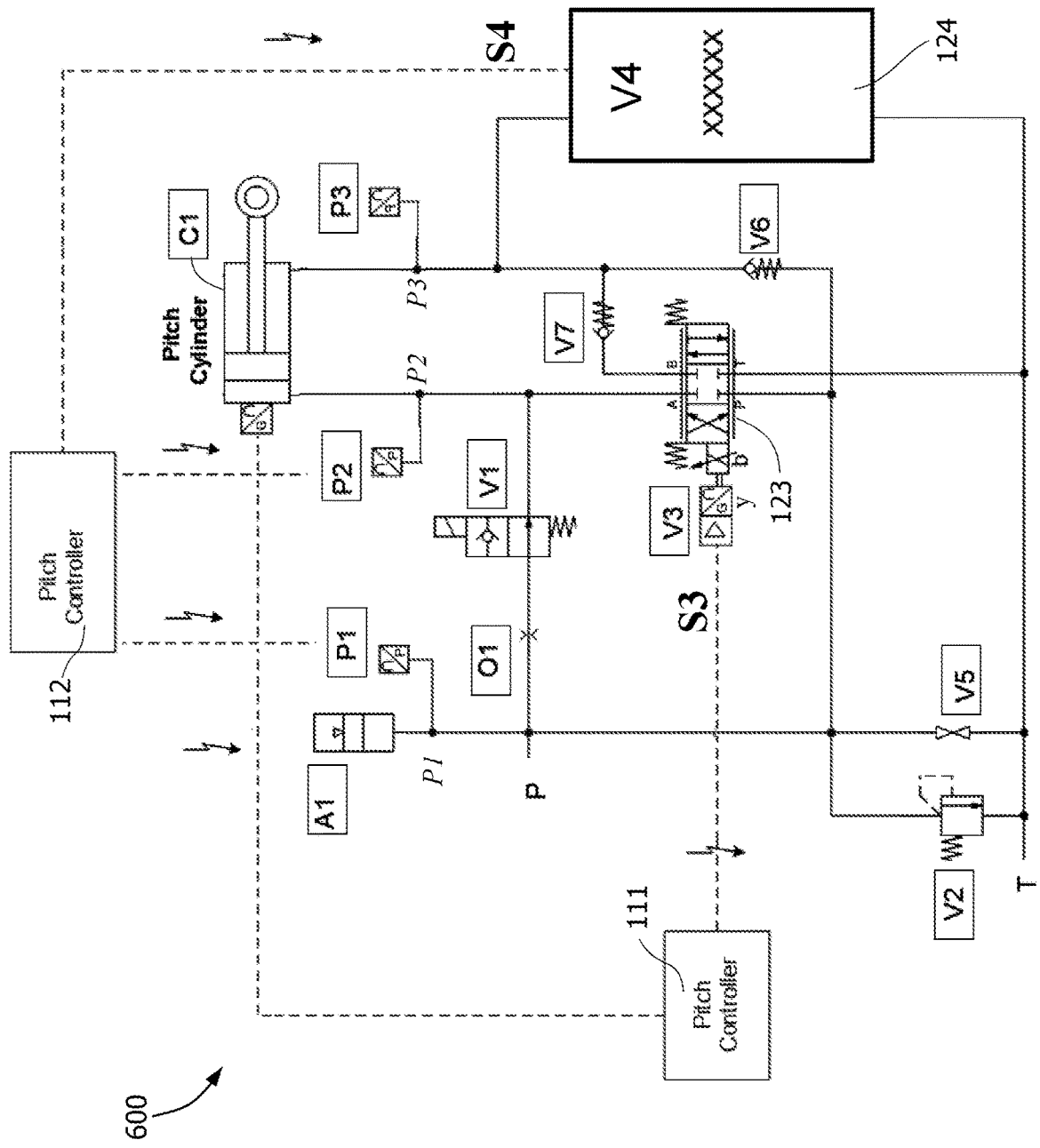
FIG. 6 is a schematic diagram of a hydraulic pitch drive system according to a further embodiment.

FIG. 6 shows a schematic diagram of a hydraulic pitch drive system 600 according to a further embodiment. The hydraulic pitch drive system 600 of FIG. 6 generally corresponds to the hydraulic pitch drive system 500 of FIG. 5. However, the second control module 112 of the hydraulic pitch drive system 600 is directly connected to sensors for measuring the first and second pressures P1 and P2. The second control module may then be configured to directly determine a load parameter indicative of the cylinder load, from a comparison of the observed values for the first and second pressures. Typically, the load parameter is determined based on the difference between the first and second pressures. A secondary control signal S4 may thus be generated directly based on measurements indicative of a current cylinder load, so as to lower the third pressure by a controlled leakage flow through the second proportional valve V4. In FIG. 6, the hydraulic pitch drive system 600 is shown with a generic proportional valve arrangement 124 comprising the second proportional valve V4. As further detailed in the following, advantageously the proportional valve arrangement 124 may be implemented in numerous different ways, with advantageous embodiments 724, 824, 924, 1024, 1124, 1224, 1324, 1424 as given in the following with reference to FIGS. 7-14.

Figure 7:
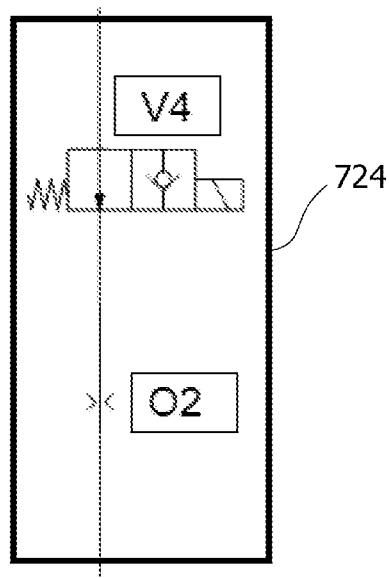
FIG. 7 is a diagram of an on/off valve arrangement.

FIG. 7 shows a valve arrangement 724 with a pulse-width-modulation (PWM) controlled ON/OFF valve allowing for a metered flow which is proportional to the duty cycle of the pulse-width-modulated signal controlling the valve element. The valve V4 in FIG. 7 is of the normally open type, thereby providing an emergency stop functionality. The flow path is adapted for emergency stop flow by providing an orifice O2 in series with the PWM controlled valve V4, which determines the maximum flow rate as required in an emergency operation, when the valve V4 is de-energized, i.e. in the ON state.

Figure 8:
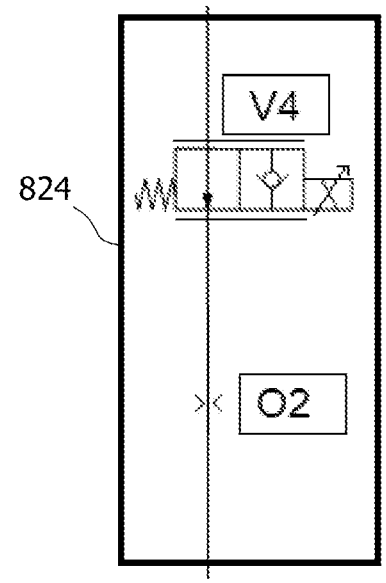

FIG. 8 shows a valve arrangement 824 with a normally open proportional flow control valve V4. When energized, under normal operation, the valve V4 may control the leakage flow there through proportional to an applied control signal. When the proportional flow control valve V4 of FIG. 8 is de-energized, the flow is only constraint by the orifice O2, thereby providing an emergency stop functionality as discussed above.

Figure 9:
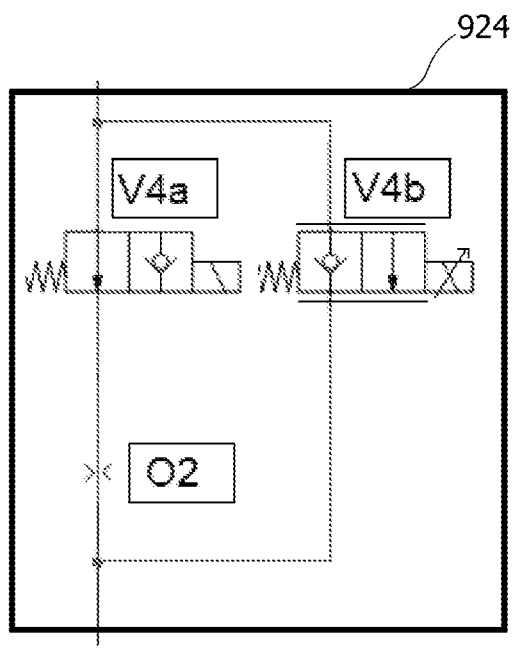

FIG. 9 shows a valve arrangement 924 comprising two valves V4a and V4b operating in parallel. Valve V4b is a normally closed proportional flow control valve, which is adapted to control a flow there through proportional to an applied control signal. The valve V4b of FIG. 9 is closed when de-energized and cannot therefore provide an emergency stop flow path. Instead, the emergency stop functionality is implemented in a simple, normally open ON/OFF valve V4a, which is arranged in parallel to the proportional flow control valve V4b. When de-energized, V4a is in the ON state, and the flow through the valve arrangement is determined by the orifice O2 arranged in the same branch as and in series with the valve V4a.

Figure 10:
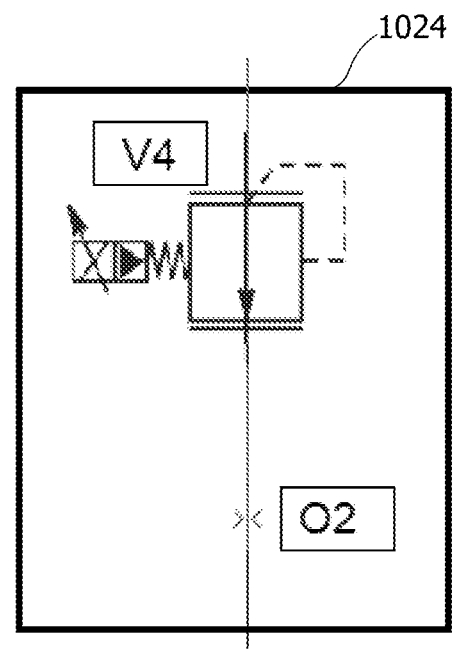

FIG. 10 shows a valve arrangement 1024 with a normally open proportional pressure control valve V4. When energized, under normal operation, the valve V4 may control the upstream pressure (i.e. the third pressure P3) proportional to an applied control signal. When the proportional pressure control valve V4 of FIG. 10 is de-energized, the flow is essentially only constraint by the orifice O2, thereby providing an emergency stop functionality as discussed above.

FIG. 11 shows a valve arrangement 1124 comprising two valves V4a and V4b operating in parallel. Valve V4b is a normally closed proportional pressure control valve, which is adapted to control an upstream pressure (i.e. the third pressure P3) proportional to an applied control signal. The valve V4b of FIG. 11 is closed when de-energized and cannot therefore provide an emergency stop flow path. Instead, the emergency stop functionality is implemented in a simple, normally open ON/OFF valve V4a, which is arranged in parallel to the proportional pressure control valve V4b. When de-energized, V4a is in the ON state, and the flow through the valve arrangement is determined by the orifice O2 arranged in the same branch as and in series with the valve V4a.

FIG. 12 shows a valve arrangement 1224 with a hydraulic logic element, where a valve opening is controlled directly in response to an applied hydraulic pilot signal. Advantageously, the valve element V4 may be connected to receive the first and second pressures P1 and P2 as pilot pressures through valve ports 3 and 4, wherein a pilot pressure bias may be adjusted so as to control a bias for the pressure difference between the first and second pressures P1 and P2 governing valve opening for the flow path from port 2 to port 1 of the valve. Thereby a direct hydraulic implementation of the in-situ load dependent control of the third pressure P3 at the rod-side is achieved. It may thus be noted that the control signal S4 for controlling the hydraulic proportional valve arrangement may also be derived by a hydraulic logic.

A yet further valve arrangement 2224 is seen in FIG. 22, where the solution is implemented with a proportional control valve 2225 controlling the pilot-pressure of an overcenter-valve 2226. In this implementation the flow from the rod-side B of the hydraulic cylinder to the tank port T does not go through the proportional control valve 2225, but through the overcenter-valve 2226. However, the flow and consequently the pressure P3 on the rod-side B of the hydraulic cylinder is still controlled by the control signal, S4, via the proportional control valve 2225.

EXAMPLES

Turning now to FIGS. 14-21, the following examples illustrate a comparison of simulated system performance of four different hydraulic pitch drive systems in an extending mode of the hydraulic cylinder. The different hydraulic pitch drive systems are discussed with reference to the simplified schematic diagram of the hydraulic control circuit of a hydraulic pitch drive system shown in FIG. 13 and described above, with respective modifications as further detailed below.

Figure 14:
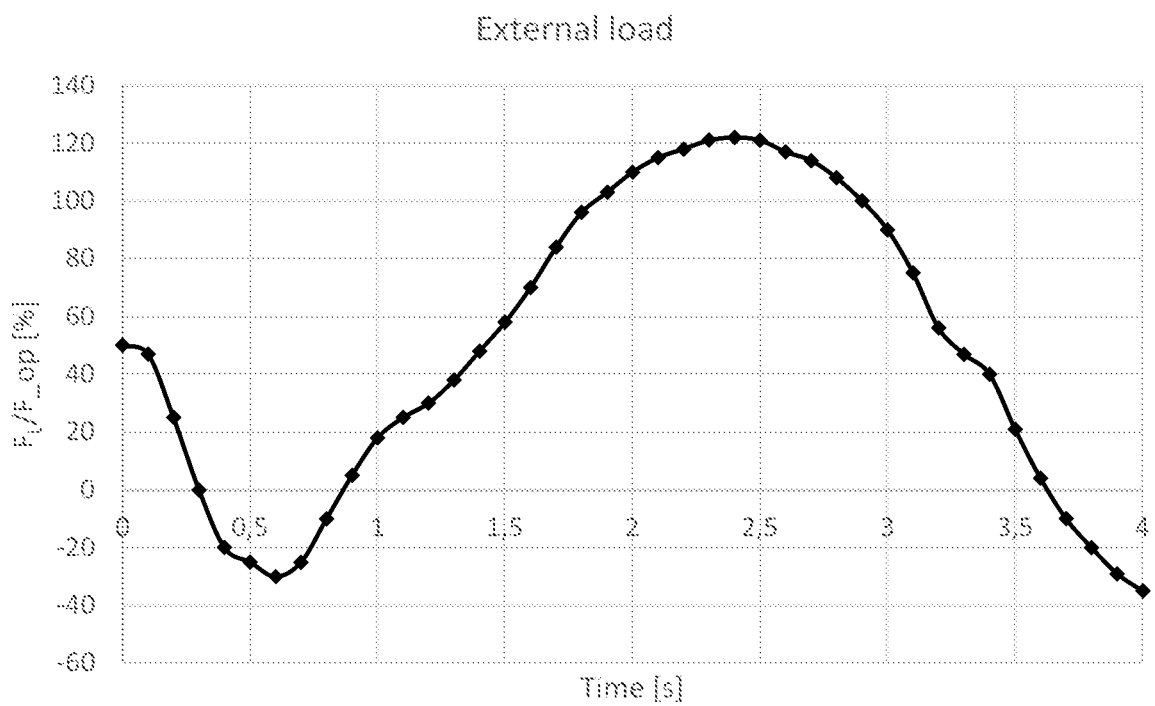
FIGS. 14-21 are graphs showing examples of simulated system parameters over time for different hydraulic pitch drive systems.
Figure 15:
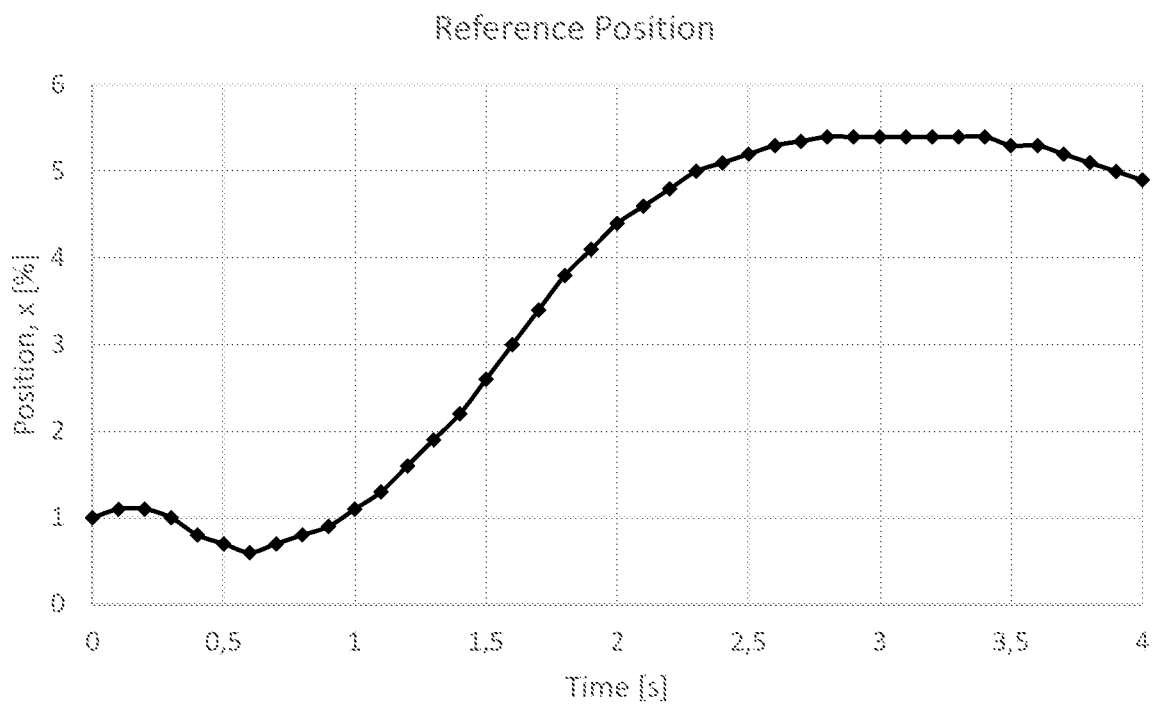

All systems are considered subject to an external load profile as a function of time as seen in FIG. 14 and a reference position profile as a function of time as seen in FIG. 15. For ease of comparison, external load values $F_L$ are scaled with respect to the maximum force capacity F_op of the given hydraulic pitch drive system, at a rated accumulator operating pressure P1, wherein the maximum force capacity F_op corresponds to 100%. Positive values of the external load correspond to forces directed in a direction opposite to the extending actuation motion of the hydraulic cylinder, whereas negative values of the external load correspond to forces in a direction parallel to the extending actuation motion of the hydraulic cylinder. Position values x are scaled with respect to the maximum cylinder stroke, wherein the maximum stroke length corresponds to 100%. The simulated profiles shown in FIGS. 14 and 15 represent a time-dependence of an external load, and a reference position requested by a wind turbine controller, as it may be observed during typical operation of wind turbine in practice, and includes a period of excessive load beyond the maximum force capacity F_op between t=1.9 s and t=2.9 s, with a maximum external load reaching 120% at t=2.4s.

For the assessment of the system performance of the four different hydraulic pitch drive systems, a simulated response of each of these systems to the external load profile of FIG. 14 and to the reference position profile of FIG. 15 over time has been simulated for three real time parameters, namely the rod-side pressure P3 at the rod-side B of the hydraulic cylinder, a piston-side pressure P2 at the piston side A of the hydraulic cylinder, and a rod position x of the hydraulic cylinder. Pressure values for the rod-side pressure P3 and the piston-side pressure P2 are scaled with respect to the accumulator operating pressure P1 corresponding to 100%. Rod position values are scaled with respect to the maximum cylinder stroke, just like the reference position values, wherein the length of the maximum cylinder stroke corresponds to 100%.

Figure 13:
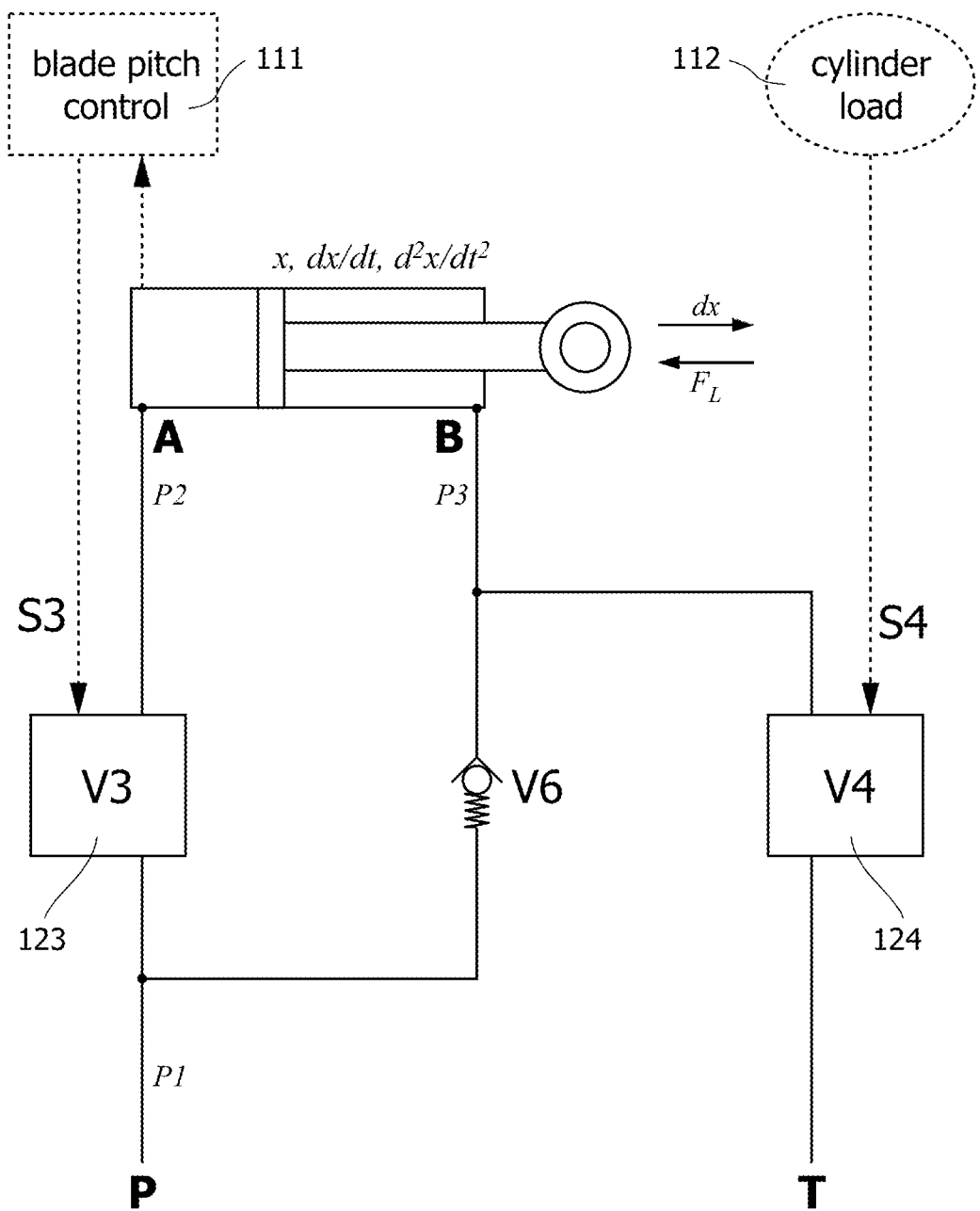
FIG. 13 a simplified schematic diagram of the hydraulic control circuit of a hydraulic pitch drive system according to one embodiment, in an extending operation mode.
Figure 16:
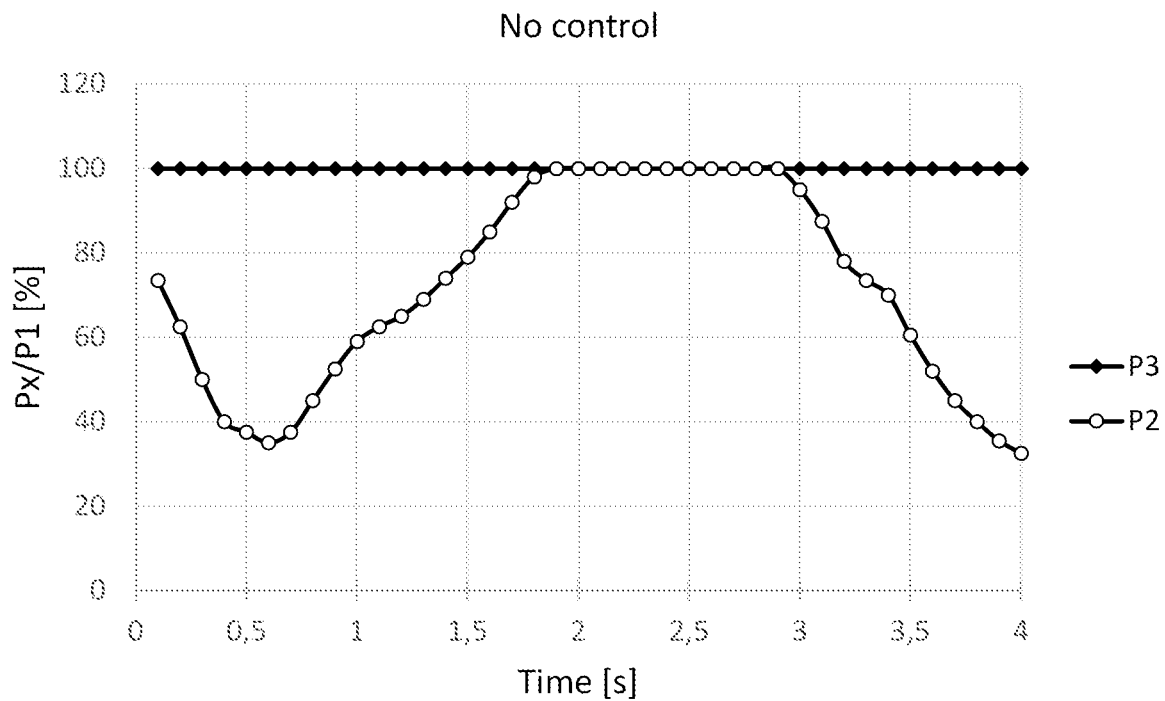
Figure 17:
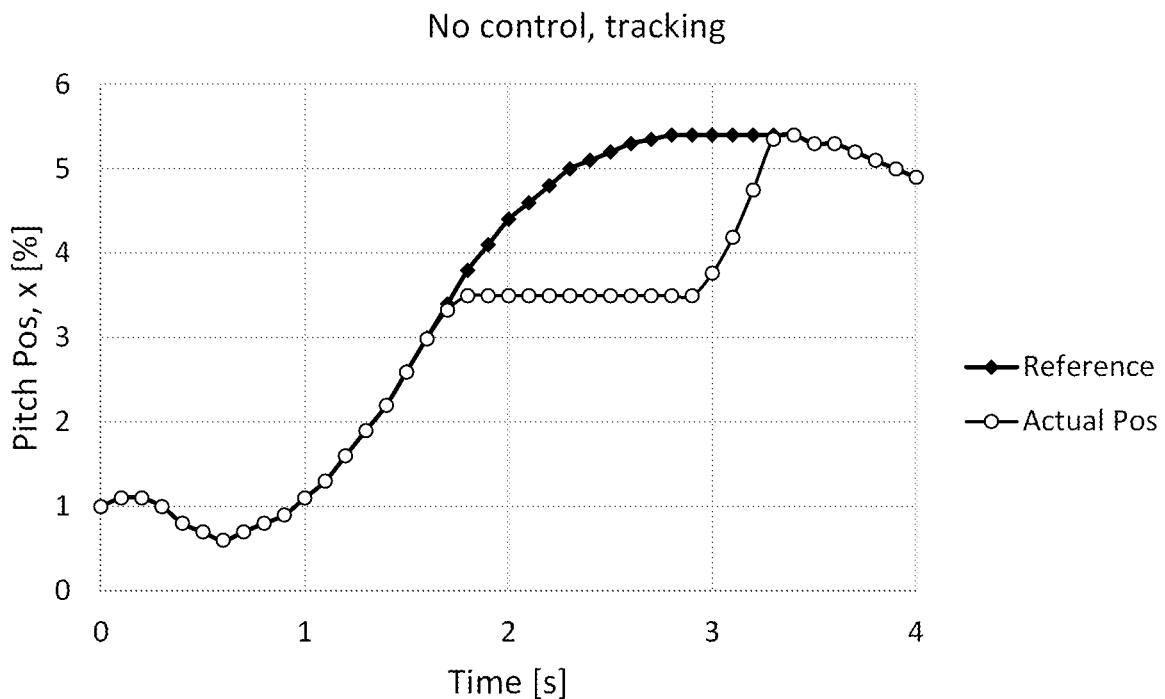

Example 1, here labelled "No control", is for a hydraulic pitch drive system as schematically shown in FIG. 13 with the modification that valve V4 is absent, or at least kept closed throughout the monitored period of time. FIG. 16 shows the corresponding pressure profiles for the rod-side pressure P3 and the piston-side pressure P2 over the monitored period. FIG. 17 shows again the reference position of FIG. 15, and schematically the actual position of the cylinder piston over the monitored period for the "No control" arrangement. The rod-side pressure P3 follows the rated accumulator operating pressure P1, wherein hydraulic fluid is recirculated from the rod-side B to the pressure port P through the non-return valve V6. The piston-side pressure P2 essentially follows the external load profile as long as the external load is below 100%. However, as the external load approaches and exceeds 100%, the piston side pressure also approaches and saturates at the rated accumulator operating pressure P1. As a consequence, a flow of hydraulic fluid across the primary hydraulic proportional valve V3 from the pressure port P to the piston side A stagnates. The piston cannot sustain any further extending actuation motion. With friction being a significant portion of the external load, the hydraulic pitch drive system comes to a standstill until the external load again drops below 100%, the piston side pressure P2 drops below, and the extending motion may resume as schematically shown by the open circles marking the actual piston position x in FIG. 17.

Figure 18:
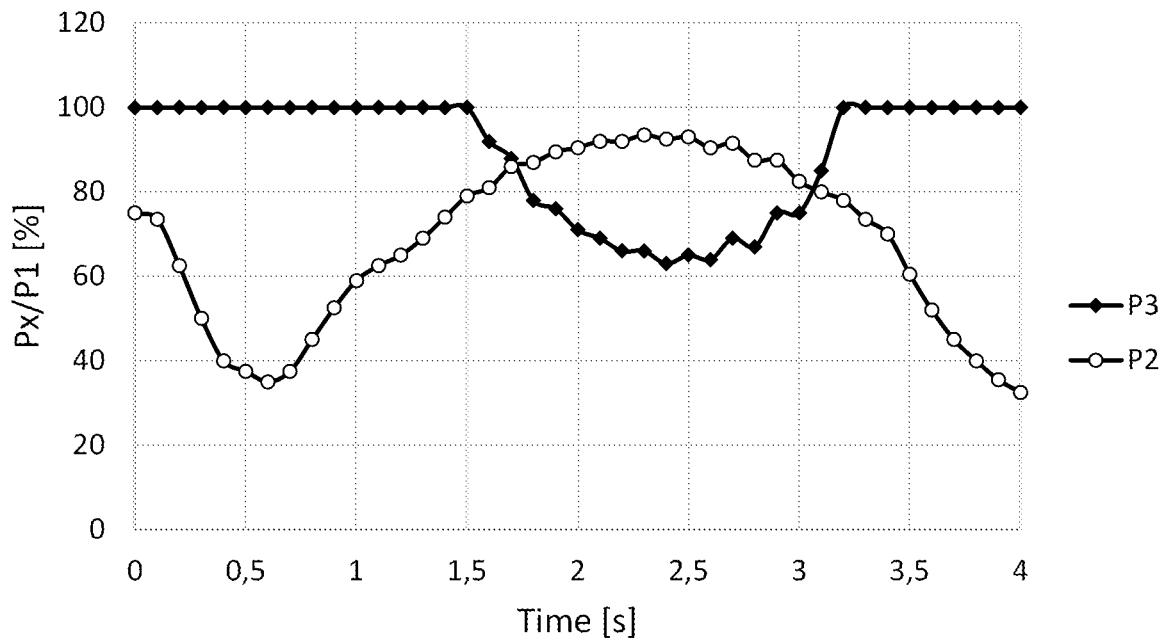

Example 2, here labelled "Independent proportional control", is for a hydraulic pitch drive system according to an embodiment of the invention, as schematically shown in FIG. 13, wherein the secondary valve V4 is a hydraulic proportional valve controlled in response to a secondary signal S4, such as a valve arrangement according to any of the embodiments shown in FIGS. 8-12. FIG. 18 shows the corresponding pressure profiles for the rod-side pressure P3 and the piston-side pressure P2 over the monitored period. As in example 1, the piston-side pressure P2 starts out by essentially following the external load profile as the hydraulic pitch system, by means of the primary hydraulic proportional valve V3, is controlled to track the reference position requested by the wind turbine controller. However, in response to the monitored piston-side pressure P2 exceeding a threshold value of 80%, a secondary control signal S4 is generated such that the second hydraulic proportional valve V4 gradually opens, wherein a set-point of the second hydraulic proportional valve V4 may be determined according to the difference between the piston-side pressure P2 and the threshold value. The second hydraulic proportional valve V4 may close again as the piston-side pressure P2 drops again below the threshold value. By gradually opening the second hydraulic proportional valve hydraulic fluid is drained in a well-controlled manner directly to the tank port T, and independent of the setting of the primary hydraulic proportional valve V3. As a consequence, the rod-side pressure P3 may be lowered according to the setting of the second hydraulic proportional valve V4 in a well-controlled manner, independent of the flow control of pressurized hydraulic fluid from the pressure port P to the piston side A via the first hydraulic proportional valve V3. The piston side pressure P2 is also gradually controlled to lower values as compared to the "No control" configuration in example 1, and does not reach saturation anymore in the region of excessive external load. The hydraulic pitch drive system of example 2 thereby reliably maintains a pitch force reserve allowing for sustaining the uninterrupted extending actuation motion of the hydraulic cylinder also in the region of excessive external load.

Figure 19:
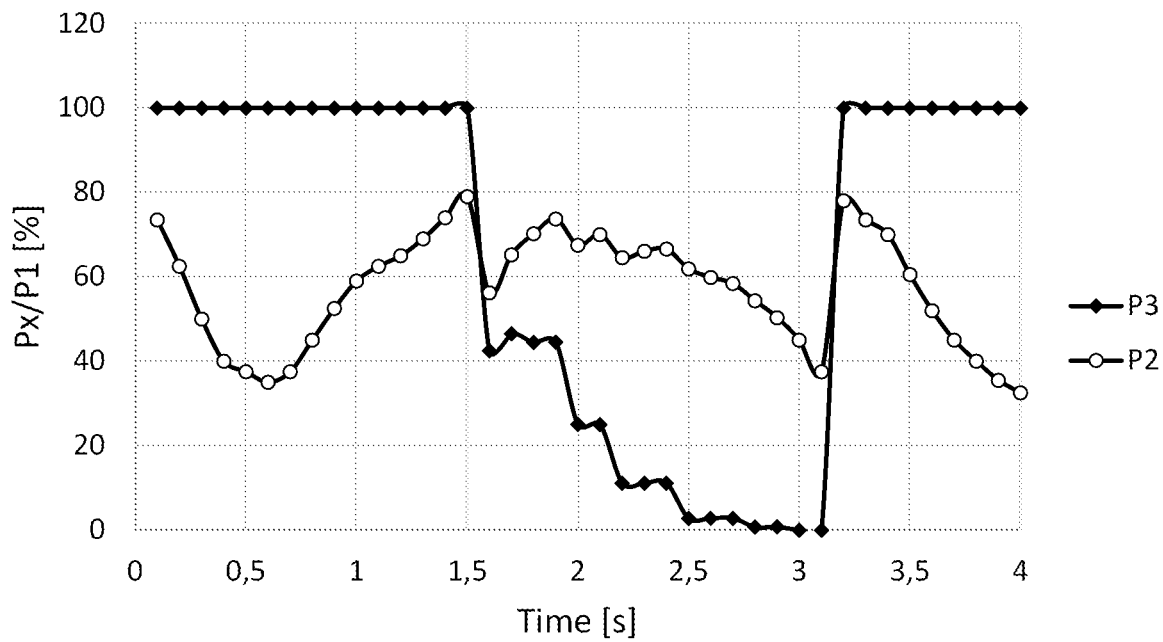

Example 3, here labelled as "Digital control", is for a hydraulic pitch drive system as schematically shown in FIG. 13 with the modification that the second valve V4 is a hydraulic ON/OFF valve controlled in response to a secondary signal S4, such as a valve arrangement according to FIG. 7. FIG. 19 shows the corresponding pressure profiles for the rod-side pressure P3 and the piston-side pressure P2 over the monitored period. As in examples 1 and 2, the piston-side pressure P2 starts out by essentially following the external load profile as the hydraulic pitch system, by means of the primary hydraulic proportional valve V3, is controlled to track the reference position requested by the wind turbine controller. However, in response to the monitored piston-side pressure P2 exceeding a threshold value of 80%, a secondary control signal S4 is generated instructing the ON/OFF valve to open allowing hydraulic fluid from the rod-side to drain to the tank port. Thereby, the rod-side pressure P3 rapidly drops, and the piston side pressure also rapidly drops. As a consequence a larger pitch force reserve is provided almost instantaneously facilitating a controlled extending actuation motion of the hydraulic cylinder also in the region of excessive external load.

Figure 20:
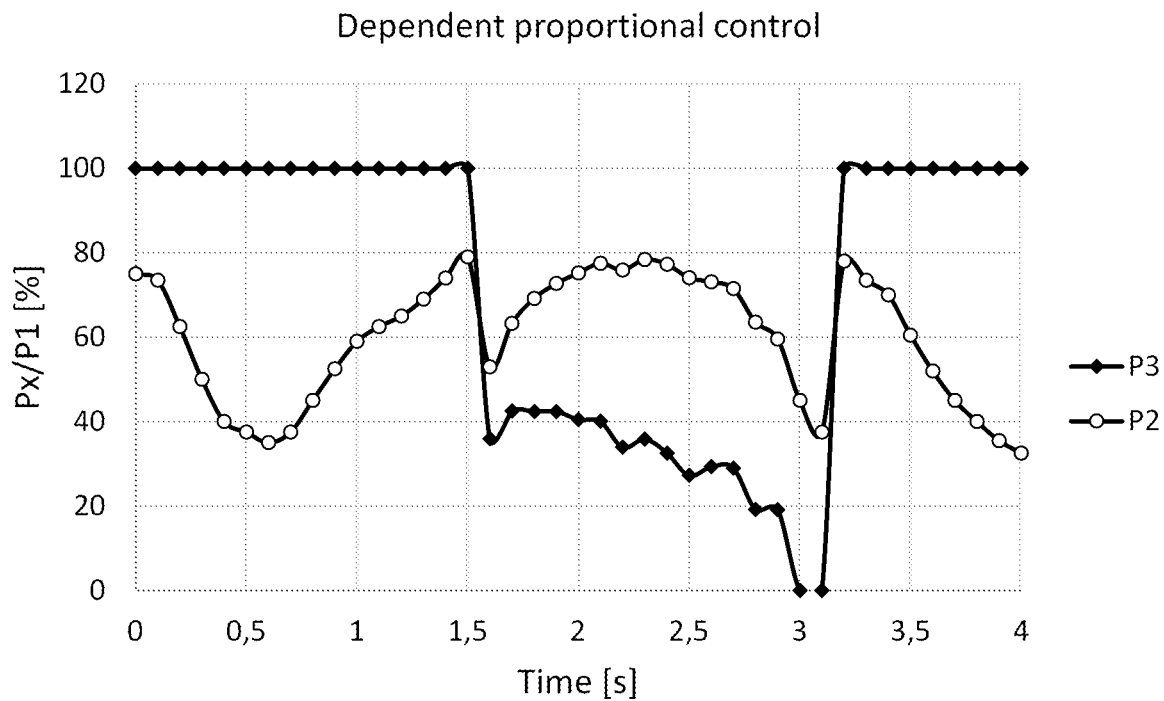

Example 4, here labelled as "Dependent proportional control", is for a hydraulic pitch drive system as schematically shown in FIG. 13 with the modification that the second valve V4 is a hydraulic ON/OFF valve controlled in response to a secondary signal S4, such as a valve arrangement according to FIG. 7, and with the additional modification that the drain line from the second valve V4 to the tank port T passes via a parallel port in the first hydraulic proportional valve V3. In fact, the configuration of example 4 may be seen to correspond to the arrangement of valve V7 in FIG. 5 or FIG. 6 with the further modification that V7 can be controlled to an open position when the hydraulic pitch system is in an extending operation mode, and where the second valve arrangement V4 is omitted. FIG. 20 shows the corresponding pressure profiles for the rod-side pressure P3 and the piston-side pressure P2 over the monitored period. As in the previous examples, the piston-side pressure P2 essentially reflects the external load profile for external loads below the maximum force capacity F_op, and as long as the second valve V4 remains closed. Accordingly, the rod-side pressure P3 saturates at 100% in the same regions. Once the piston-side pressure P2 exceeds a threshold of 80% the second valve V4 is controlled to an open position, and like in example 3, the valve arrangement for "dependent proportional control" of example 4 provides an almost instantaneous auxiliary pitch force reserve, when the first proportional valve V3 largely opened. Adjusting the set-point of the first hydraulic proportional valve V3 then allows for controlling the extending actuation motion of the hydraulic cylinder also in the region of excessive external load, wherein the amount of hydraulic fluid flowing from the rod-side B to the tank will also depend on the set-point of the first hydraulic proportional valve V3. Similar to what is seen in the pressure profiles of example 3, opening and closing of the second valve V4 results in pronounced jumps in both the rod-side pressure P3, and in the piston-side pressure P2. Lowering of the rod- and piston-side pressures P3, P2 in this manner then allows for controlling the extending actuation motion also in the region with excessive external load.

Figure 21:
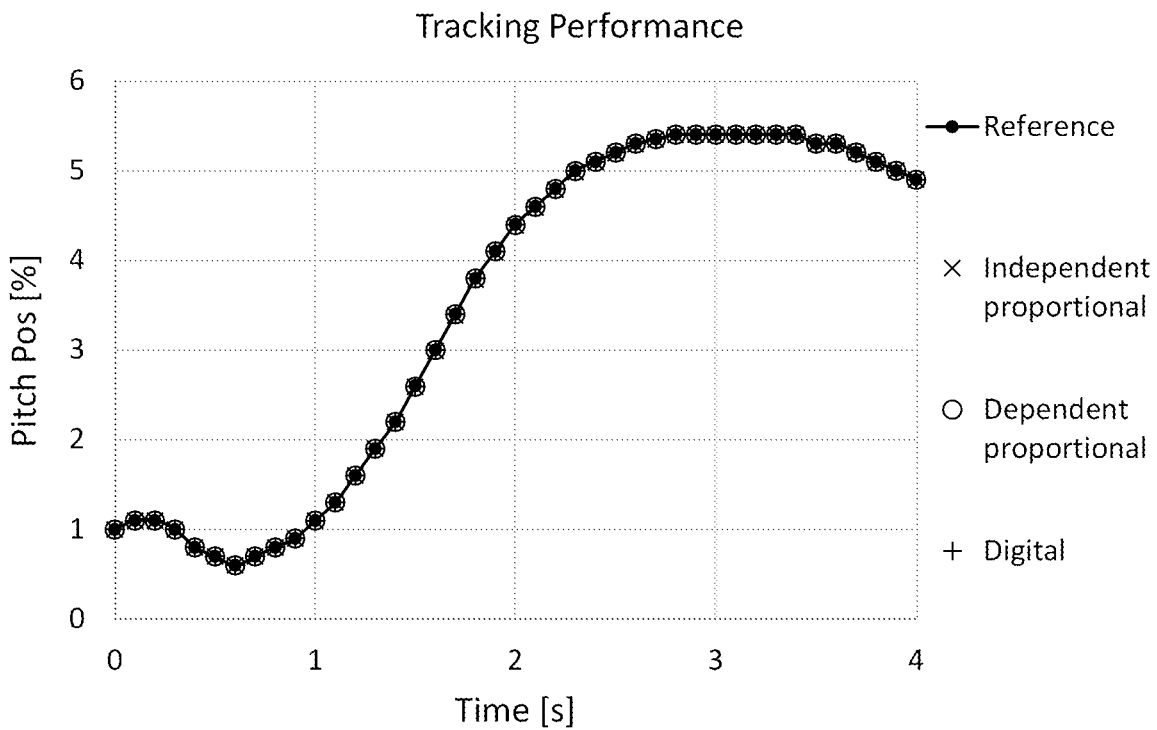

FIG. 21 shows the actual positions of the cylinder piston throughout the monitored period of time for the valve arrangements of examples 2, 3, and 4 in comparison to the reference position of FIG. 15, which is also included in FIG. 21. The comparison shows that an overall satisfying tracking performance may actually be achieved for all of the three valve arrangements of examples 2, 3, and 4. However, significant pressure jumps, such as those seen in FIGS. 19 and 20 for examples 3 and 4, are detrimental to the hydraulic components in the hydraulic pitch drive system and may therefore significantly affect the life-time of these components, and in particular of the hydraulic cylinder. In contrast thereto, the arrangement of example 2 corresponding to embodiments of the invention does not have such detrimental pressure jumps, and thus provides good tracking performance in a surprisingly gentle manner, i.e. without sacrificing on lifetime and durability of the hydraulic pitch drive system. Thereby, an adequate pitch force reserve can be maintained in a continuous and gentle manner, thus allowing for stable and fast tracking response of the hydraulic pitch drive system without the risk of undesirable and dangerous interruptions to the blade pitch actuation motion.

As evident from this comparison, embodiments of the present invention, as here illustrated by example 2, may be applied routinely as part of continued blade pitch adjustment during normal operation of a wind turbine, whereas the solutions exemplified by examples 3 and 4 sacrifice on reliability, and are therefore not in the same way viable for continued use during normal operation. Embodiments of the present invention, as here illustrated by example 2, thus allow for achieving the system dimensioning advantages mentioned above. As a consequence, the invention provides a stable and precise tracking auxiliary hydraulic pitch force system that, in contrast to known systems, is viable for continued use without being hampered by the need of predicting a future load on the hydraulic pitch force system.

The invention claimed is:

1. A hydraulic pitch drive system for controlling a blade pitch angle on a rotor of a wind turbine, the pitch drive system comprising:
a hydraulic cylinder with a piston-side and a rod-side, the hydraulic cylinder being arranged to actuate blade pitch rotation;
a first hydraulic proportional valve arranged for controlling a flow of hydraulic fluid from a pressure port to the hydraulic cylinder in response to a primary control signal; wherein in an extending mode of the hydraulic cylinder the pressure port via the first hydraulic proportional valve is connected to the piston-side of the hydraulic cylinder; wherein the rod-side of the hydraulic cylinder is connected to the pressure port via a recirculation line comprising a non-return valve, wherein the non-return valve is arranged for flow in a direction from the rod-side of the hydraulic cylinder to the pressure port;
wherein the primary control signal is provided in response to a blade pitch angle positioning request;
a second hydraulic proportional valve arranged for controlling a flow of the hydraulic fluid from the rod-side to a tank port independent of the first hydraulic proportional valve, in response to a secondary control signal;
wherein the secondary control signal is provided so as to control a set point of the second hydraulic proportional valve for controlling the second hydraulic proportional valve in the extending mode of the hydraulic cylinder.

2. The hydraulic pitch drive system according to claim 1, wherein the secondary control signal is determined to control the set point of the second hydraulic proportional valve responsive to one or more parameters indicative of a current operational status of the hydraulic pitch drive system.

3. The hydraulic pitch drive system according to claim 1, wherein the secondary control signal is determined according to a cylinder load on the hydraulic cylinder.

4. The hydraulic pitch drive system according to claim 1, wherein the secondary control signal is determined with respect to one or more threshold values.

5. The hydraulic pitch drive system according to claim 4, wherein the one or more threshold values is/are determined based on one or more of: a first pressure at the pressure port, a second pressure at the piston-side, a third pressure at the rod-side, a rod position x of the hydraulic cylinder and/or time derivatives $dx/dt$ or $d^2x/dt^2$ thereof, a target blade pitch angle b0 and/or time derivatives $db0/dt$ or $d^2b0/dt^2$ thereof, or a blade azimuth angle.

6. The hydraulic pitch drive system according to claim 1, wherein the secondary control signal is configured such that the second hydraulic proportional valve is opened in response to a parameter indicative of cylinder load exceeding a first threshold value.

7. The hydraulic pitch drive system according to claim 6, wherein the secondary control signal is determined based on the difference between the parameter indicative of cylinder load and the first threshold value.

8. The hydraulic pitch drive system according to claim 1, wherein the secondary control signal is configured such that the second hydraulic proportional valve is closed in response to a parameter indicative of cylinder load dropping below a second threshold value.

9. The hydraulic pitch drive system according to claim 1, wherein the secondary control signal is determined based on one or more of: a first pressure at the pressure port, a second pressure at the piston-side, a third pressure at the rod-side, a rod position x of the hydraulic cylinder and/or time derivatives $dx/dt$ or $d^2x/dt^2$ thereof, a target blade pitch angle b0 and/or time derivatives $db0/dt$ or $d^2b0/dt^2$ thereof, or a blade azimuth angle.

10. The hydraulic pitch drive system according to claim 1, wherein the secondary control signal is determined based on a combination of two or more of: a first pressure at the pressure port, a second pressure at the piston-side, a third pressure at the rod-side, a rod position x of the hydraulic cylinder and/or time derivatives $dx/dt$ or $d^2x/dt^2$ thereof, a target blade pitch angle b0 and/or time derivatives $db0/dt$, $d^2b0/dt^2$ thereof, or a blade azimuth angle.

11. The hydraulic pitch drive system according to claim 1, wherein the secondary control signal is determined based on a difference between a first pressure at the pressure port and a second pressure at the piston-side of the hydraulic cylinder.

12. The hydraulic pitch drive system according to claim 1, wherein determining the secondary control signal includes measuring one or more of: a first pressure at the pressure port, a second pressure at the piston-side, a third pressure at the rod-side, a rod position x of the hydraulic cylinder and/or time derivatives $dx/dt$ or $d^2x/dt^2$ thereof, a spool position of the first hydraulic proportional valve, a blade pitch angle b and/or time derivatives $db/dt$, $d^2b/dt^2$ thereof, or a blade azimuth angle.

13. The hydraulic pitch drive system according to claim 1, wherein determining the secondary control signal includes estimating one or more of: a first pressure at the pressure port, a second pressure at the piston-side, a third pressure at the rod-side, a rod position x of the hydraulic cylinder and/or time derivatives $dx/dt$ or $d^2x/dt^2$ thereof, a blade pitch angle b and/or time derivatives $db/dt$, $d^2b/dt^2$ thereof, or a blade azimuth angle.

14. The hydraulic pitch drive system according to claim 1, wherein the secondary control signal is determined based on a comparison between an actual value and a predetermined reference value of a parameter indicative of the cylinder load.

15. The hydraulic pitch drive system according to claim 1, wherein the secondary control signal is determined selectively in response to predetermined operation instructions including a blade pitch feathering instruction.

16. The hydraulic pitch drive system according to claim 1, wherein the second hydraulic proportional valve is one of: a normally open flow control valve, a normally closed flow control valve, a normally open pressure control valve, a normally closed pressure control valve, or a pulse width modulation controlled ON/OFF valve.

17. The hydraulic pitch drive system according to claim 1, wherein the second hydraulic proportional valve is a normally open valve configured when de-energized to provide an open connection from the rod-side to the tank port, said open connection being adapted for emergency stop.

18. The hydraulic pitch drive system according to claim 1, wherein the second hydraulic proportional valve is a normally closed valve, and wherein the hydraulic pitch system further comprises a bypass valve arrangement providing an open connection from the rod-side to the tank port parallel to the normally closed valve when the bypass valve arrangement is de-energized, said open connection being adapted for emergency stop.

19. The hydraulic pitch drive system according to claim 1, wherein the second hydraulic proportional valve is a hydraulic pilot pressure controlled valve, including a hydraulic logic element, an overcenter valve, a counterbalance valve, a sequence valve, or a pilot assisted relief valve.

20. The hydraulic pitch drive system according to claim 19, wherein a pilot pressure for controlling the hydraulic pilot pressure controlled valve is provided by one of: an electrically controlled proportional valve, hydraulic components, or a combination of an electrically controlled proportional valve and hydraulic components.

\* \* \* \* \*